(12) United States Patent
Toda

(10) Patent No.: US 8,115,949 B2
(45) Date of Patent: Feb. 14, 2012

(54) IMAGE FORMING SYSTEM, PRINTING APPARATUS, IMAGE PROCESSING APPARATUS, CONTROL METHOD THEREFOR, AND PROGRAM

(75) Inventor: Masayuki Toda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1134 days.

(21) Appl. No.: 11/510,807

(22) Filed: Aug. 28, 2006

(65) Prior Publication Data
US 2007/0046973 A1 Mar. 1, 2007

(30) Foreign Application Priority Data
Aug. 30, 2005 (JP) ................................. 2005-249948

(51) Int. Cl.
 G06F 3/12 (2006.01)
 G06F 3/00 (2006.01)
 G06K 15/00 (2006.01)
(52) U.S. Cl. ..................... 358/1.15; 358/1.13; 358/1.16; 358/1.14; 399/24; 399/82; 710/17
(58) Field of Classification Search ................ 358/1.13, 358/1.15, 1.16, 1.14, 1.1; 399/24, 82, 83, 399/87; 710/17, 18, 19
See application file for complete search history.

(56) References Cited

U.S. PATENT DOCUMENTS

| | | | |
|---|---|---|---|
| 4,858,171 A | 8/1989 | Furusawa et al. | |
| 5,323,212 A | 6/1994 | Fukui | |
| 5,995,723 A | 11/1999 | Sperry et al. | |
| 6,430,382 B1 | 8/2002 | Okamoto et al. | ............... 399/82 |
| 6,606,163 B1 | 8/2003 | Suzuki et al. | |
| 6,796,730 B2 | 9/2004 | Toda et al. | ...................... 400/76 |
| 6,873,425 B1 | 3/2005 | Boyce | |
| 6,963,412 B1 | 11/2005 | Toda | .............................. 58/1.13 |
| 7,161,702 B2 | 1/2007 | Toda | ............................... 8/1.15 |

(Continued)

FOREIGN PATENT DOCUMENTS

CN 1251928 5/2000

(Continued)

OTHER PUBLICATIONS

U.S. Appl. No. 11/683,320, filed Mar. 7, 2007, (Toda).

(Continued)

Primary Examiner — Thomas Lett
(74) Attorney, Agent, or Firm — Fitzpatrick, Cella, Harper & Scinto

(57) ABSTRACT

An image processing apparatus inputs print data from an external device, and analyzes the input print data. The image processing apparatus rasterizes the print data into first image data on the basis of the analysis result. The image processing apparatus receives status information representing the status of a printing apparatus, temporarily saves the first image data in a holding unit on the basis of the received status information and the analysis result, interrupts a transfer process for the first image data to the printing apparatus, starts the transfer process for second image data to the printing apparatus, and transfers, to the printing apparatus, setting information of the print data that corresponds to the first image data. The printing apparatus determines whether corresponding image data has been received within a predetermined period after reception of the setting information of the print data from the image processing apparatus. The printing apparatus manages a print job based on the setting information as a reservation job on the basis of the determination result. Upon reception of image data of the managed reservation job, the printing apparatus starts a printing process for the image data.

16 Claims, 22 Drawing Sheets

U.S. PATENT DOCUMENTS

| | | |
|---|---|---|
| 7,172,260 B2 | 2/2007 | Yoshida et al. |
| 7,483,159 B2 | 1/2009 | Tokutomo et al. |
| 2003/0002063 A1 | 1/2003 | Oomura et al. ............. 358/1.11 |
| 2003/0076525 A1 | 4/2003 | Hikawa |
| 2003/0090696 A1 | 5/2003 | Willis et al. |
| 2003/0122890 A1* | 7/2003 | Shimada et al. ................ 347/19 |
| 2003/0159114 A1 | 8/2003 | Nishikawa et al. |
| 2003/0214667 A1* | 11/2003 | Ishikura et al. ............. 358/1.13 |
| 2004/0145772 A1* | 7/2004 | Stringham ................... 358/1.15 |
| 2004/0179230 A1* | 9/2004 | Kitada et al. ................ 358/1.15 |
| 2004/0213615 A1 | 10/2004 | Nako |
| 2005/0052679 A1 | 3/2005 | Green et al. |
| 2005/0105117 A1 | 5/2005 | Oh et al. |
| 2006/0017960 A1 | 1/2006 | Kakigi |
| 2006/0133832 A1 | 6/2006 | Watanabe et al. |
| 2007/0046995 A1 | 3/2007 | Toda et al. |

FOREIGN PATENT DOCUMENTS

| | | |
|---|---|---|
| CN | 1340757 | 3/2002 |
| EP | 996055 | 4/2000 |
| JP | 2001-096870 | 4/2001 |
| JP | 2001-195214 A | 7/2001 |

OTHER PUBLICATIONS

U.S. Appl. No. 11/683,346, filed Mar. 7, 2007, (Toda).

U.S. Appl. No. 11/510,602, filed Aug. 28, 2006, (Toda).

\* cited by examiner

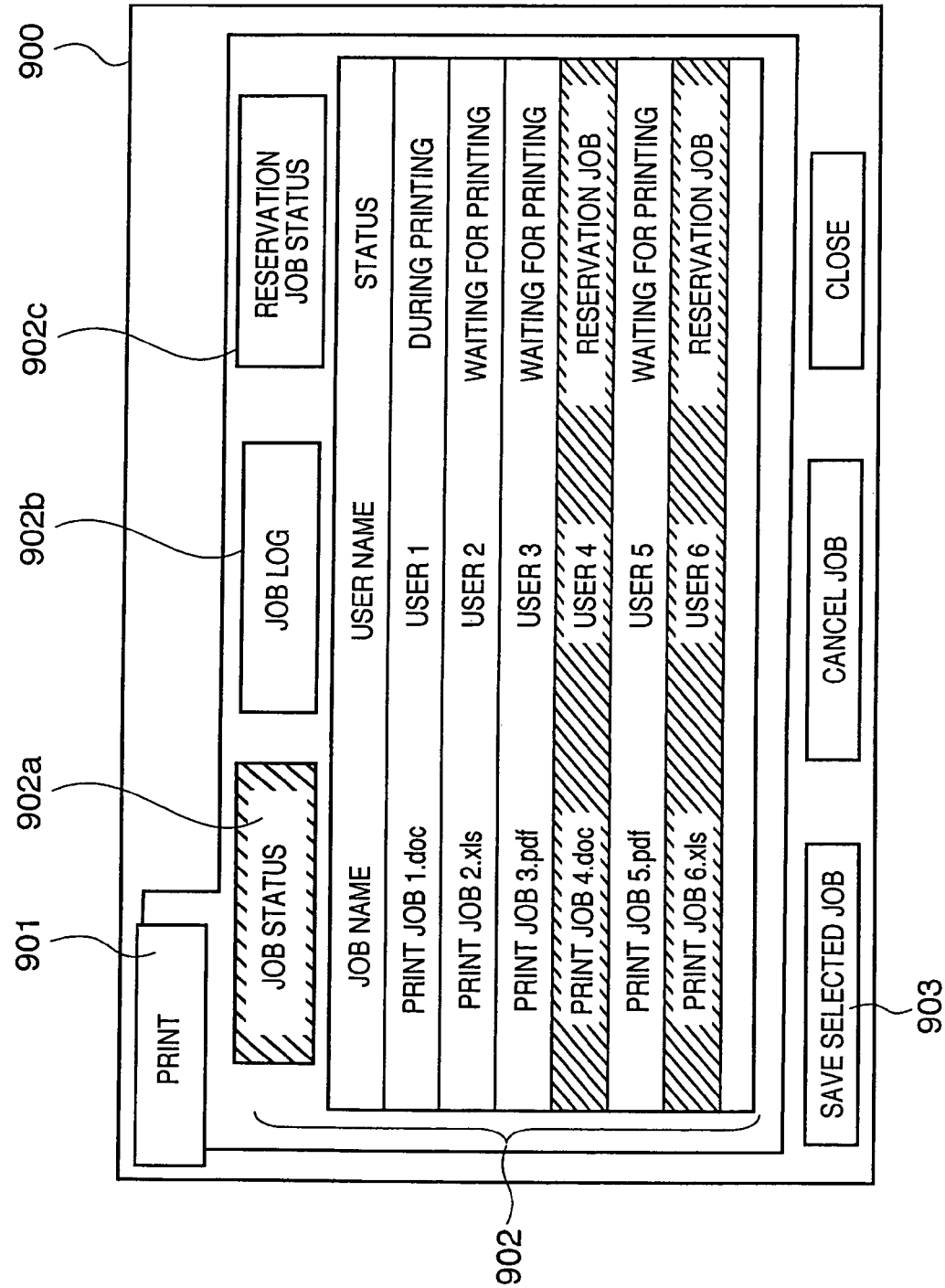

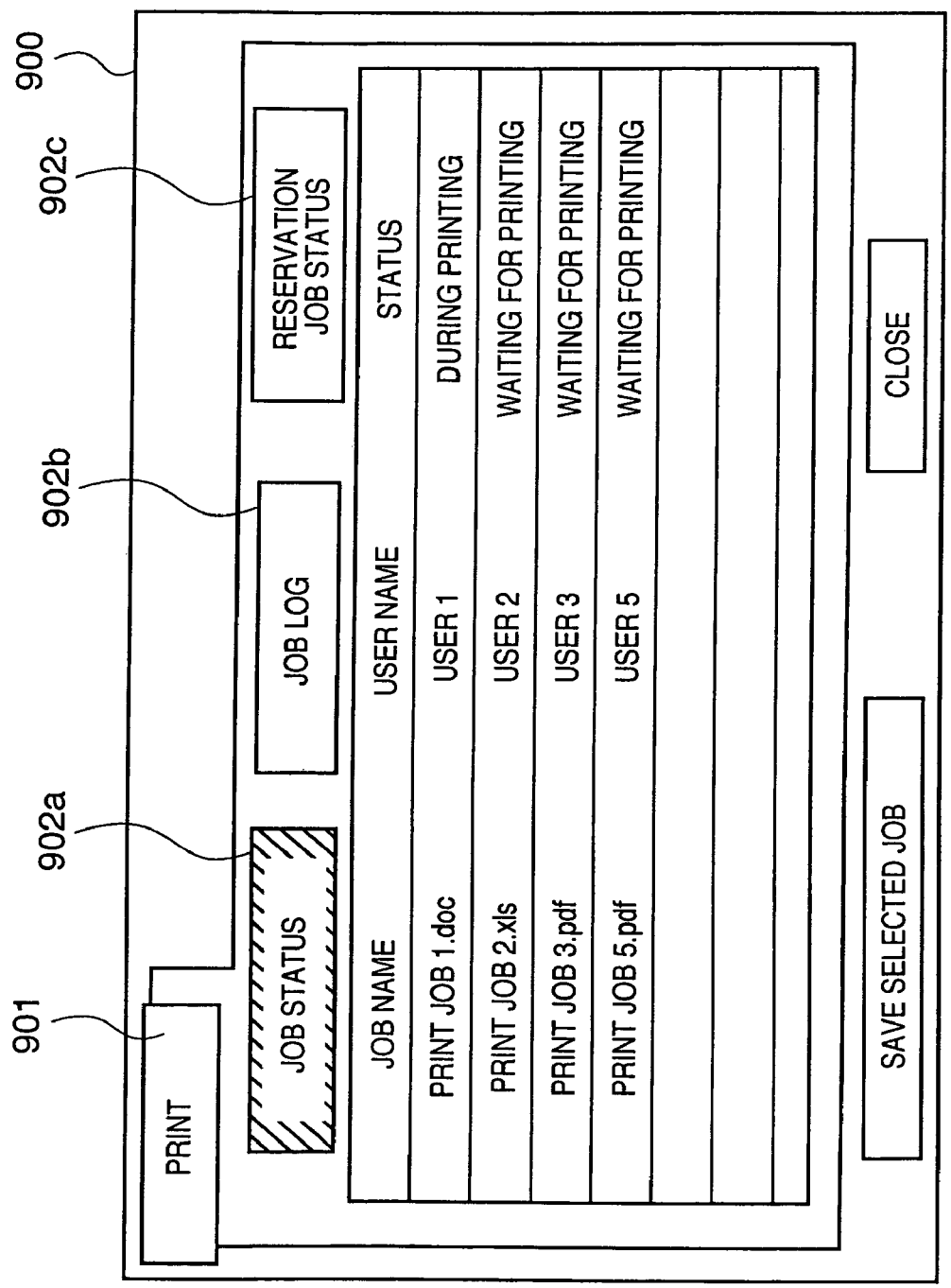

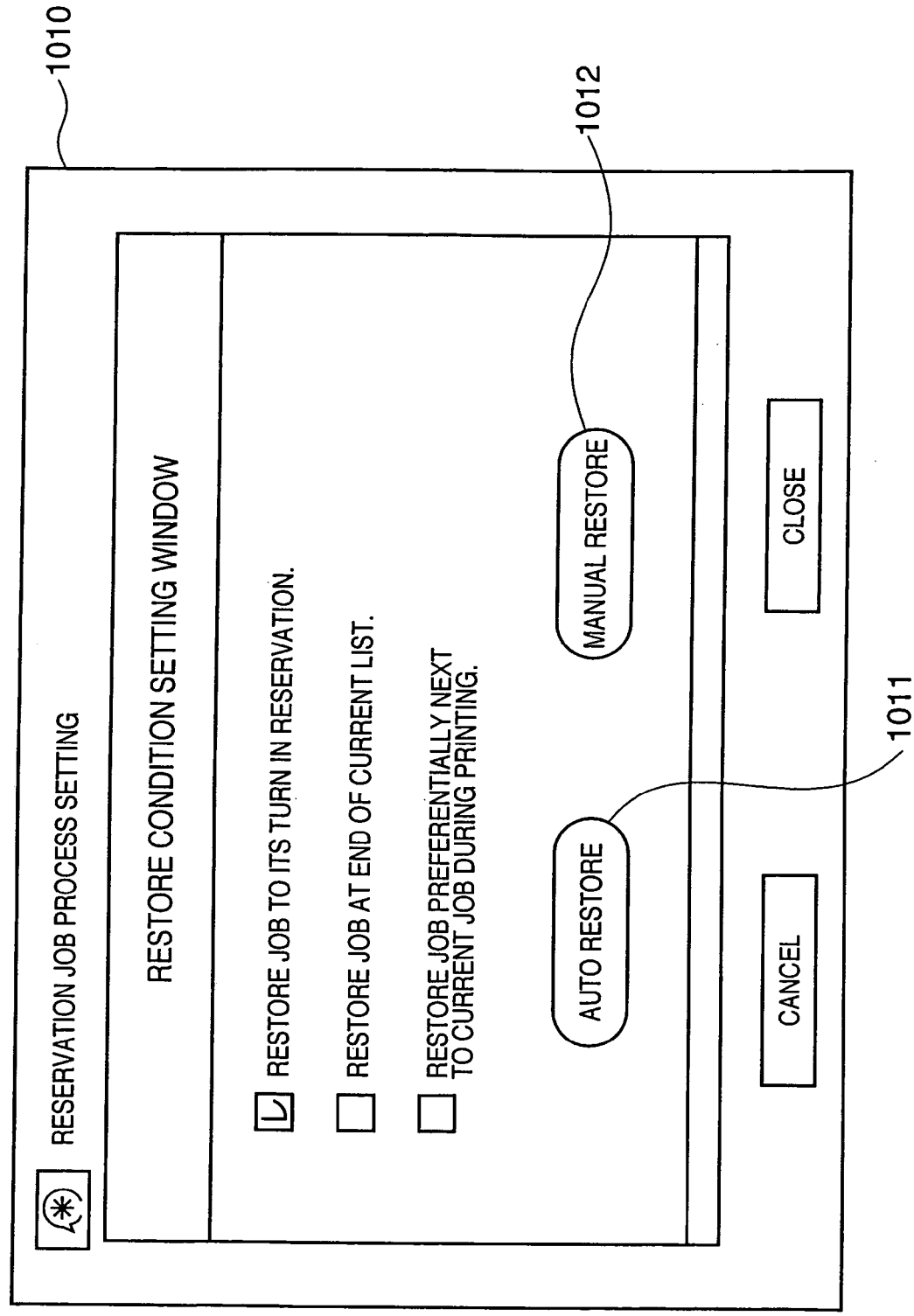

IMAGE FORMING SYSTEM, PRINTING APPARATUS, IMAGE PROCESSING APPARATUS, CONTROL METHOD THEREFOR, AND PROGRAM

BACKGROUND OF THE INVENTION

1. Field of the Invention

The present invention relates to an image forming system which has an image processing apparatus and printing apparatus and transfers print data from the image processing apparatus to the printing apparatus, a printing apparatus, an image processing apparatus, a control method therefor, and a program.

2. Description of the Related Art

In the commercial printing industry, a third party (customer or client) places an order to create a printed product (e.g., magazine, newspaper, brochure, advertisement, or gravure), and a printed product desired by the client is created. The printed product is delivered to the client to get the fee from the client. Even now, the commercial printing industry mainly uses large-scale printing apparatuses such as an offset reproduction printing press.

In the commercial printing industry, work proceeds through various processes. The processes include, for example, entry, design & layout, comprehensive layout (presentation using a printer output), proofreading (layout correction and color correction), proof (proof print), block copy preparation, printing, post process, and shipping. When the above-mentioned printing press is used, a block copy must be prepared. Once the block copy is prepared, it is difficult and disadvantageous in cost to correct the block copy. This problem arises from the fact that careful proofreading, i.e., layout check and color confirmation are indispensable.

As described above, in this industry, large-scale apparatuses are needed, and a long time is taken to create a printed product desired by a client. Work operations require expert knowledge and know-how of experts called craftsmen.

Nowadays, with the advent of high-speed and high-quality electrophotographic and inkjet printing apparatuses, a print-on-demand business category is present against the conventional printing industry. Print-on-demand will be abbreviated as POD hereinafter.

The POD intends to group jobs handled by a printing apparatus into jobs of relatively small lots and print the jobs in a short delivery period without using any large-scale apparatus or system. The POD implements digital printing using electronic data by making the best of digital image forming apparatuses such as a digital copying machine and digital multi-function peripheral, instead of the above-mentioned large-scale printing press and printing method. The POD market of the POD business category is being developed. In this POD market, printing is merged with digitization more than in the conventional printing industry, and management and control using computers become widespread. By utilizing the computers, POD printing is coming close to a given level of the printing industry.

In this background, the POD market provides PFP which is a printing service for a copy/print shop, and CRD which is an in-house printing service. The PFP stands for Print For Pay, and the CRD stands for Centralized Reproduction Department.

The advantages of the PFP and CRD are a lower cost and shorter delivery period in comparison with offset printing. In the POD market, it is important how to shorten the downtime of the printing apparatus and increase the printing productivity. In the POD market, a dedicated operator often performs a printing process.

A configuration for increasing the printing productivity is disclosed in, e.g., Japanese Patent Laid-Open No. 2001-96870. In Japanese Patent Laid-Open No. 2001-96870, when job A having no stapling instruction and job B having a stapling instruction are successively processed, an initial operation on stapling of subsequent job B is executed parallel to a process for preceding job A. The parallel operation shortens the process of job B after the process of job A.

In Japanese Patent Laid-Open No. 2001-96870, it is examined to increase the productivity of a plurality of jobs by the system.

In a printing environment such as the POD environment, it is an important factor for a business chance how to efficiently process many print jobs in order to meet various requests from various users (clients). It is desired to provide a convenient, user-friendly printing system capable of flexibly coping with this situation. For this purpose, examinations should be made on the assumption of an operation environment, practices, needs, and the like at an actual site.

Assume that a print job of many pages is requested from the customer or many jobs are processed in the POD environment. In this situation, the working efficiency may decrease if the operator always monitors the printing apparatus until all print jobs are completed. At the work site, therefore, it is expected that the operator moves away from the printing apparatus and performs another work even during printing by the apparatus. At this time, if an error factor such as absence of print sheets or absence of toner used for printing occurs in the printing apparatus, it is expected that the printing apparatus temporarily interrupts the printing process.

Assume that a subsequent print job waits after the interrupted print job in this situation, and the subsequent job is free from any printing interruption factor. Even in this situation, it is expected that processes for all print jobs by the printing apparatus stop due to the error factor generated in the current print job. In this case, the printing process of the printing apparatus may stop until the operator cancels the error factor or printing of the print job is canceled. As a result, the productivity of print jobs may be influenced in the whole system.

In order to avoid this situation, for example, a configuration will be examined in which an image processing apparatus connected to a printing apparatus is arranged separately from the printing apparatus, and executes a pre-process for print data to be supplied to the printing apparatus (FIG. 19). In this configuration, when print data becomes transmittable from the image processing apparatus to the printing apparatus, the image processing apparatus determines whether resources necessary for the print job are set in the printing apparatus.

If it is determined that not all necessary resources are set, the print job is temporarily saved, and a subsequent print job is preferentially processed. This configuration may cope with the above-described situation, and high efficiency can be expected. However, there is a situation which cannot be dealt with this configuration. It is desired to deal with even this situation.

An image forming system will be assumed in which an image processing apparatus is arranged outside a printing apparatus, as shown in FIG. 19. In this case, a print job transmitted from the image processing apparatus is temporarily spooled in a storage such as the internal hard disk of the printing apparatus.

In a state in which several print jobs wait for printing in the printing apparatus, even if all necessary resources are prepared in transmitting a print job to the printing apparatus, the necessary resources may run short in actual turn for printing.

To the contrary, even if not all necessary resources are prepared in transmitting a print job to the printing apparatus, all the necessary resources may be prepared in actual turn for printing.

The following problem may arise especially when not all necessary resources are prepared in transmitting a print job to the printing apparatus, the print job is temporarily saved, and a subsequent print job is preferentially processed. For example, even if print data of the temporarily saved print job is transmitted to the printing apparatus upon detecting that all resources necessary for the print job are prepared, the subsequent print job has already been set in the printing apparatus and waits for printing. The temporarily saved print job is printed later than original turn.

SUMMARY OF THE INVENTION

The present invention has been made to overcome the conventional drawbacks. It is an object of the present invention to provide a configuration capable of efficiently continuing a printing process even when an error occurs in a printing apparatus in an image forming system in which image data to be printed is generated by an image processing apparatus and supplied to the printing apparatus. In particular, the present invention can construct a convenient system which can efficiently process a job even if an error occurs, and also copes with the above-described matters of concern assumable in a system configuration as shown in FIG. 19.

According to the present invention, the foregoing object is attained by providing an image forming system which has an image processing apparatus and a printing apparatus and transfers print data from the image processing apparatus to the printing apparatus, the image processing apparatus comprises:
an input unit adapted to input print data from an external device;
an analysis unit adapted to analyze the print data input from the input unit;
a rasterizing unit adapted to rasterize the print data into first image data on the basis of an analysis result by the analysis unit;
a holding unit adapted to hold data;
a reception unit adapted to receive status information representing a status of the printing apparatus from the printing apparatus; and
a transfer control unit adapted to temporarily save the first image data in the holding unit on the basis of the status information received by the reception unit and the analysis result by the analysis unit, interrupt a transfer process for the first image data to the printing apparatus, start the transfer process for second image data to the printing apparatus, and transfer, to the printing apparatus, setting information of the print data that corresponds to the first image data, and
the printing apparatus comprises:
a transmission unit adapted to transmit, to the image processing apparatus, the status information representing the status of the printing apparatus;
a determination unit adapted to determine whether corresponding image data has been received within a predetermined period after reception of setting information of the print data from the image processing apparatus;
a management unit adapted to manage a print job based on the setting information as a reservation job on the basis of a determination result by the determination unit; and
a print control unit adapted to start a printing process for image data of the reservation job managed by the management unit upon reception of the image data.

In a preferred embodiment, when a resource necessary to print the first image data rasterized from the print data is not contained in resources which are represented by the status information and set in the printing apparatus, as a result of analyzing the print data by the analysis unit, the transfer control unit temporarily saves the first image data in the holding unit, interrupts the transfer process for the first image data to the printing apparatus, starts the transfer process for the second image data to the printing apparatus, and transfers, to the printing apparatus, the setting information of the print data that corresponds to the first image data.

In a preferred embodiment,
the image processing apparatus further comprises a save condition setting unit adapted to make save condition setting for save in the holding unit, and
the transfer control unit temporarily saves the first image data in the holding unit on the basis of the status information received by the reception unit, the analysis result by the analysis unit, and a setting content of the save condition setting, interrupts the transfer process for the first image data to the printing apparatus, starts the transfer process for the second image data to the printing apparatus, and transfers, to the printing apparatus, the setting information of the print data that corresponds to the first image data.

In a preferred embodiment, when a resource necessary to print image data saved in the holding unit is detected from the status information, the transfer control unit starts the transfer process for the image data to the printing apparatus.

In a preferred embodiment, the printing apparatus further comprises a restore condition setting unit adapted to make restore condition setting for restoring the printing process for the image data of the reservation job managed by the management unit upon reception of the image data.

In a preferred embodiment, the printing apparatus further comprises an instruction unit adapted to designate restore to the printing process for the image data of the reservation job managed by the management unit upon reception of the image data.

In a preferred embodiment, the apparatus further comprises a restore method designation unit for restore designated by the instruction unit,
wherein the print control unit restores the printing process for the image data of the reservation job managed by the management unit upon reception of the image data.

In a preferred embodiment, the printing apparatus further comprises
a list display unit adapted to display a list of print data during printing and wait for printing, and
a display control unit adapted to display print data corresponding to the reservation job managed by the management unit so as to discriminate the print data from another printable print data.

In a preferred embodiment, the printing apparatus further comprises
a reservation print data list display unit adapted to display a reservation print data list of print data corresponding to the reservation job managed by the management unit, and
a restore instruction unit adapted to designate restore of the printing process for corresponding image data upon reception of the image data among print data in the reservation print data list.

According to the present invention, the foregoing object is attained by providing an image processing apparatus which transfers print data to a printing apparatus, comprising:

an input unit adapted to input print data from an external device;

an analysis unit adapted to analyze the print data input from the input unit;

a rasterizing unit adapted to rasterize the print data into first image data on the basis of an analysis result by the analysis unit;

a holding unit adapted to hold data;

a reception unit adapted to receive status information representing a status of the printing apparatus from the printing apparatus; and a transfer control unit adapted to temporarily save the first image data in the holding unit on the basis of the status information received by the reception unit and the analysis result by the analysis unit, interrupt a transfer process for the first image data to the printing apparatus, start the transfer process for second image data to the printing apparatus, and transfer, to the printing apparatus, setting information of the print data that corresponds to the first image data.

According to the present invention, the foregoing object is attained by providing a printing apparatus which receives print data from an image processing apparatus, comprising:

a transmission unit adapted to transmit, to the image processing apparatus, status information representing a status of the printing apparatus;

a determination unit adapted to determine whether corresponding image data has been received within a predetermined period after reception of setting information of the print data from the image processing apparatus;

a management unit adapted to manage a print job based on the setting information as a reservation job on the basis of a determination result by the determination unit; and a print control unit adapted to start a printing process for image data of the reservation job managed by the management unit upon reception of the image data.

According to the present invention, the foregoing object is attained by providing a method of controlling an image processing apparatus which transfers print data to a printing apparatus, comprising the steps of:

inputting print data from an external device;

analyzing the input print data;

rasterizing the print data into first image data on the basis of a result of the analysis;

receiving status information representing a status of the printing apparatus from the printing apparatus; and temporarily saving the first image data in a holding unit on the basis of the received status information and the analysis result, interrupting a transfer process for the first image data to the printing apparatus, starting the transfer process for second image data to the printing apparatus, and transferring, to the printing apparatus, setting information of the print data that corresponds to the first image data.

According to the present invention, the foregoing object is attained by providing a method of controlling a printing apparatus which receives print data from an image processing apparatus, comprising the steps of:

transmitting, to the image processing apparatus, status information representing a status of the printing apparatus;

determining whether corresponding image data has been received within a predetermined period after reception of setting information of the print data from the image processing apparatus;

managing a print job based on the setting information as a reservation job in a storage device on the basis of a result of the determination; and starting a printing process for image data of the reservation job managed in the storage medium upon reception of the image data.

According to the present invention, the foregoing object is attained by providing a program stored in a computer-readable storage medium, for causing a computer to control an image processing apparatus which transfers print data to a printing apparatus, characterized by causing the computer to input print data from an external device;

analyze the input print data;

rasterize the print data into first image data on the basis of a result of the analysis;

receive status information representing a status of the printing apparatus from the printing apparatus; and temporarily save the first image data in a holding unit on the basis of the received status information and the analysis result, interrupt a transfer process for the first image data to the printing apparatus, start the transfer process for second image data to the printing apparatus, and transfer, to the printing apparatus, setting information of the print data that corresponds to the first image data.

According to the present invention, the foregoing object is attained by providing a program stored in a computer-readable storage medium, for causing a computer to control a printing apparatus which receives print data from an image processing apparatus, characterized by causing the computer to transmit, to the image processing apparatus, status information representing a status of the printing apparatus;

determine whether corresponding image data has been received within a predetermined period after reception of setting information of the print data from the image processing apparatus;

manage a print job based on the setting information as a reservation job in a storage device on the basis of a result of the determination; and start a printing process for image data of the reservation job managed in the storage medium upon reception of the image data.

The present invention can provide a configuration capable of efficiently continuing a printing process even when an error occurs in a printing apparatus in an image forming system in which image data to be printed is generated by an image processing apparatus and supplied to the printing apparatus. Further, the present invention can construct a convenient system which can efficiently process a job even if an error occurs, and also copes with the above-described matters of concern assumable in a system configuration in which a printing apparatus and image processing apparatus are independent of each other.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 11A and 11B are views showing an example of a job status window according to the embodiment of the present invention;

FIGS. 12A and 12B are views showing an example of a user mode setting window according to the embodiment of the present invention;

DESCRIPTION OF THE EMBODIMENT

A preferred embodiment of the present invention will be described in detail in accordance with the accompanying drawings.

[Overall Configuration]

Figure 1A:
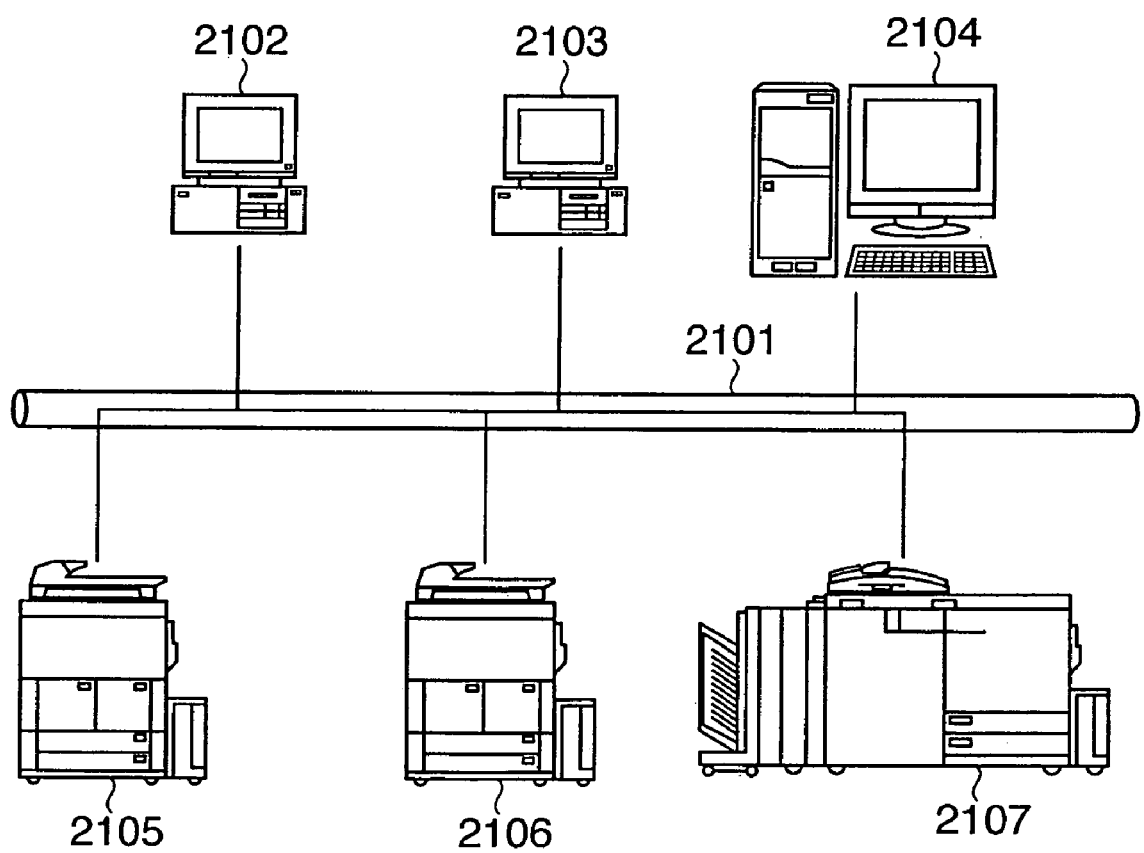
FIG. 1A is a schematic view showing an image forming system according to an embodiment of the present invention.

FIG. 1A is a schematic view showing an image forming system according to the embodiment of the present invention. Personal computers (PCs) 2102 to 2104, and MFPs (Multi Function Peripherals) 2105 to 2107 functioning as image forming apparatuses are connected to a network 2101. Although not shown in FIG. 1A, other PCs or MFPs can also be connected in addition to the PCs 2102 to 2104 and the MFPs 2105 to 2107.

The PCs 2102 to 2104 will be typified by the PC, whereas the MFPs 2105 to 2107 will be typified by the MFP. The PC has standard building components (e.g., a CPU, RAM, ROM, hard disk, external storage, network interface, display, keyboard, and mouse) which are mounted in a general-purpose computer.

[Arrangement of MFP]

The arrangement of the MFP will be explained with reference to FIG. 1B.

Figure 1B:
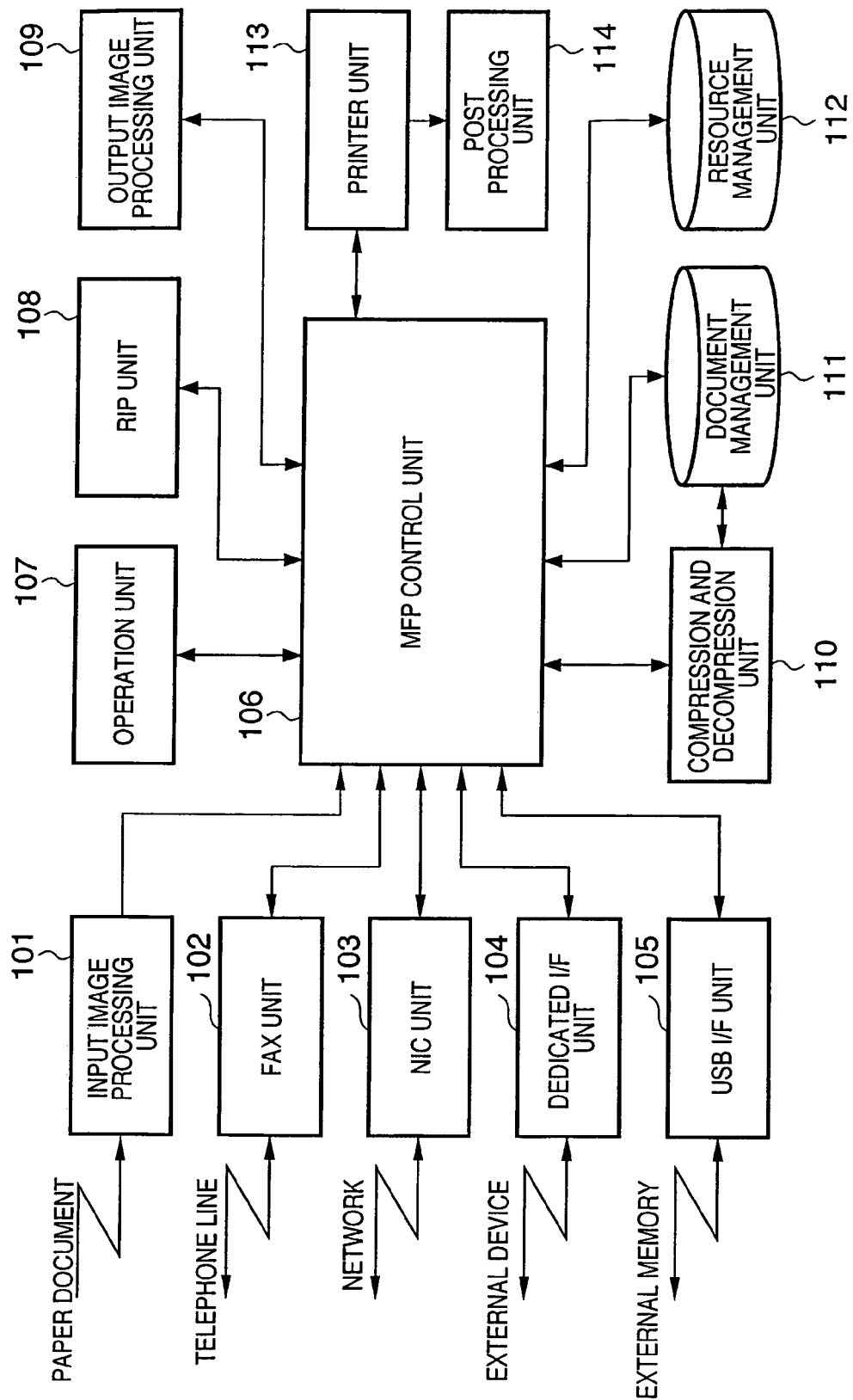
FIG. 1B is a block diagram showing the arrangement of an MFP according to the embodiment of the present invention.

FIG. 1B is a block diagram showing the arrangement of the MFP according to the embodiment of the present invention.

The MFP incorporates a storage device such as a hard disk capable of storing data of a plurality of jobs (job data). The MFP has a copying function of printing job data output from a scanner by the printing unit via the storage device. The MFP has a printing function of printing job data output from an external device such as a PC by the printer unit via the storage device. In this manner, the MFP has a plurality of functions including these functions.

MFPs are classified into full-color MFPs and monochrome MFPs. In many cases, the full-color MFP includes the arrangement of the monochrome MFP at the basic part except the color processing function, internal data, and the like. Thus, only the full-color MFP will be explained, and a description of the monochrome MFP will be added, as needed.

The image forming system may comprise a multi-function type image forming apparatus having a plurality of functions, and an SFP which is a single-function type image forming apparatus having only the printing function. Alternatively, the image forming system may comprise an image forming apparatus of either type. The image forming system may comprise a plurality of image forming apparatuses of either type. In any case, the image forming system is configured to implement control according to the embodiment.

Note that the SFP stands for Single Function Peripheral.

As shown in FIG. 1B, the MFP comprises an input image processing unit 101 which reads an image of a paper document or the like and processes the read image data, and a FAX unit 102 which is typified by a facsimile machine or the like and transmits/receives an image using a telephone line. The MFP comprises a NIC (Network Interface Card) unit 103 which transmits/receives image data and apparatus information to/from an external device such as a PC using the network 2101.

The MFP comprises a dedicated interface (I/F) unit 104 which exchanges information such as image data with an external device. The MFP also comprises a USB (Universal Serial Bus) interface (USB I/F) unit 105 which exchanges data such as image data with a USB device typified by a USB memory (kind of removable medium).

The input image processing unit 101 is implemented by, e.g., a scanner having an ADF (Auto Document Feeder).

An MFP control unit 106 controls various processes such as a process of temporarily saving image data in accordance with the application purpose of the MFP and a process of determining a data transfer path.

A document management unit 111 is implemented by a storage device such as a hard disk capable of storing a plurality of image data. Image data of a plurality of types can be stored in the document management unit 111 mainly by the control unit (e.g., the CPU and memory (RAM or ROM) of the MFP control unit 106) of the image forming apparatus.

Image data of a plurality of types include image data from the input image processing unit 101. These image data also include image data of a facsimile job input via the FAX unit 102. The image data further include image data input from an external device via the NIC unit 103, dedicated I/F unit 104, and USB I/F unit 105.

The MFP control unit 106 controls to read out image data stored in the document management unit 111, as needed, transfer the image data to an output unit such as a printer unit 113, and execute an output process such as a printing process by the printer unit 113. The MFP control unit 106 controls to transfer or distributedly transfer image data read out from the document management unit 111 to at least one external device such as a PC or another image forming apparatus via the network 2101 in accordance with an instruction from the operator.

The MFP control unit 106 performs, via a compression and decompression unit 110, a process of compressing and storing image data, as needed, in storing the image data in the document management unit 111, and a process of decompressing compressed/stored image data into original image data in reading out the image data. It is generally known that data compressed by JPEG, JBIG, ZIP, or the like is used when data is transferred through the network 2101. After such data is input to the MFP, it is decompressed by the compression and decompression unit 110.

A resource management unit 112 stores data such as various parameter tables (e.g., the font, color profile, and gamma table) which are commonly used in various image processes. These data can be called, as needed. In addition, a new parameter table can be stored, and the parameter table can be corrected and updated.

When PDL data is input to the MFP control unit 106, it undergoes a RIP process by a RIP unit 108. If necessary, an image to be printed undergoes an image process for printing by an output image processing unit 109. If necessary, intermediate data of image data generated at this time, and print ready data (bitmap data for printing or compressed data of the bitmap data) can also be stored again in the document management unit 111.

Note that the PDL stands for Page Description Language. The RIP stands for Raster Image Processor.

Image data having undergone various processes is transmitted to the printer unit 113 which forms an image. A sheet printed out from the printer unit 113 is fed into a post processing unit 114, which performs a print sheet sorting process and print sheet finishing process.

The MFP control unit 106 plays a role of smoothly flowing a job. In order to execute the following functions A) to N) in accordance with operation contents to the MFP, the MFP control unit 106 controls switching of the processing path of building components in the MFP.

It is generally known to store image data as intermediate data, as needed. However, a description of accesses except those which start and end in the document management unit 111 will be omitted. A flow will be roughly described by omitting processes by the compression and decompression unit 110 and post processing unit 114 which are used as needed, those by the MFP control unit 106 serving as the core of the whole system, and the like.

A) Copying function: the input image processing unit 101→the output image processing unit 109→the printer unit 113

B) Facsimile transmission function: the input image processing unit 101→the FAX unit 102

C) Facsimile reception function: the FAX unit 102→the output image processing unit 109→the printer unit 113

D) Network scan: the input image processing unit 101→the NIC unit 103

E) Network printing: the NIC unit 103→the RIP unit 108→the output image processing unit 109→the printer unit 113

F) Scan to external device: the input image processing unit 101→the dedicated I/F unit 104

G) Printing from external device: the dedicated I/F unit 104→the RIP unit 108→the output image processing unit 109→the printer unit 113

H) Scan to external memory: the input image processing unit 101→the USB I/F unit 105

I) Printing from external memory: the USB I/F unit 105→the RIP unit 108→the output image processing unit 109→the printer unit 113

J) Box scan function: the input image processing unit 101→the output image processing unit 109→the document management unit 111

K) Box printing function: the document management unit 111→the printer unit 113

L) Box reception function: the NIC unit 103→the RIP unit 108→the output image processing unit 109→the document management unit 111

M) Box transmission function: the document management unit 111→the NIC unit 103

N) Preview function: the document management unit 111→an operation unit 107

In addition to the above functions, combinations with various functions such as an E-mail service and Web server function are conceivable, but a description thereof will be omitted.

Of the above functions A) to N), J) box scan function, K) box printing function, L) box reception function, or M) box transmission function is an MFP processing function accompanying write and read of data using the document management unit 111. These processing functions are to divide the storage area in the document management unit 111 for respective jobs and respective users, temporarily save data, and input/output data in combination with a user ID and password.

The operation unit 107 is used to select various flows and functions described above and designate an operation. With the high-resolution display device of the operation unit 107, for example, a process of previewing image data stored in the document management unit 111, and if the image data is checked "OK", printing the image data can also be implemented.

The detailed arrangement of the MFP control unit 106 will be explained with reference to FIG. 2.

Figure 2:
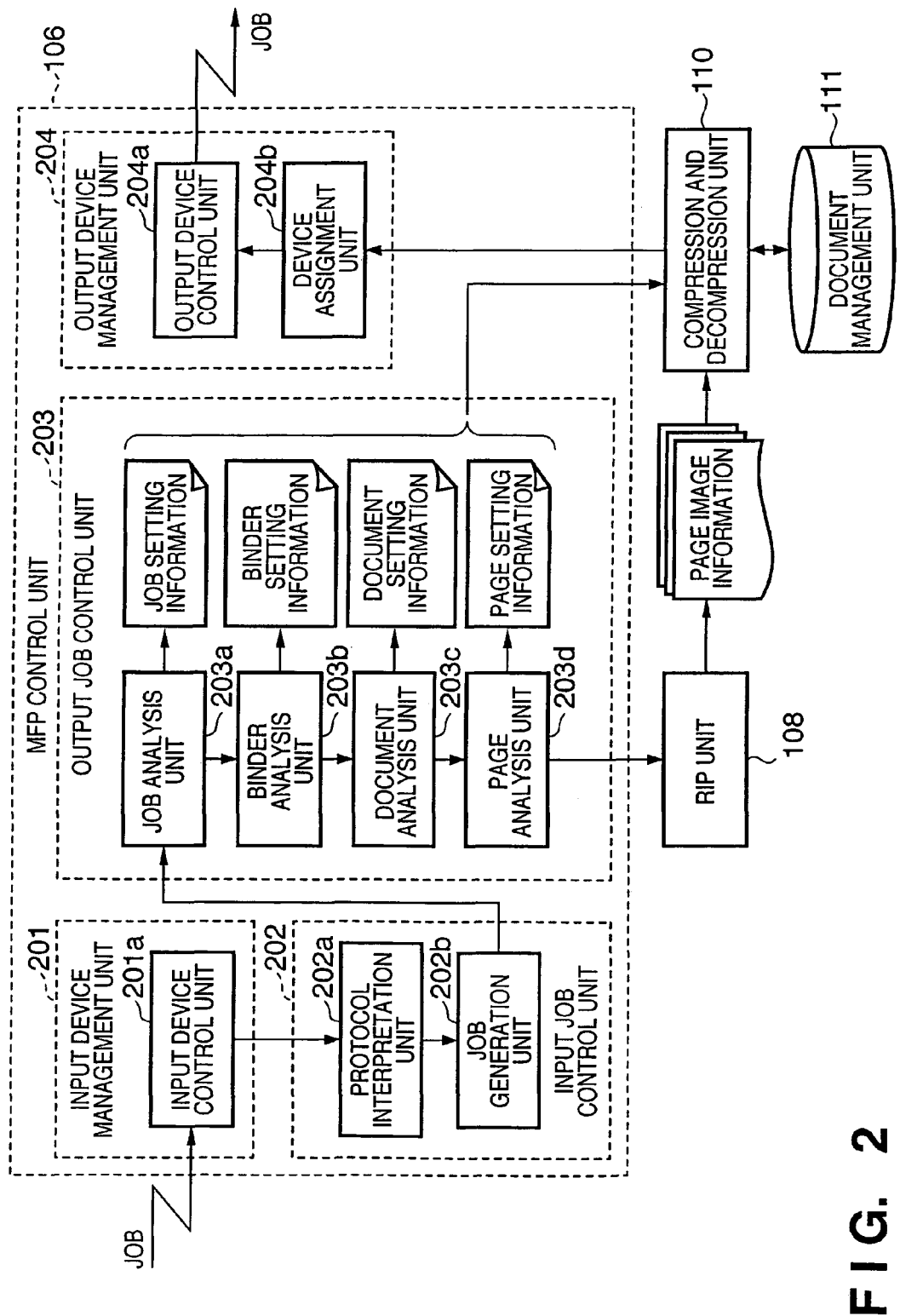
FIG. 2 is a block diagram showing the detailed arrangement of an MFP control unit according to the embodiment of the present invention.

FIG. 2 is a block diagram showing the detailed arrangement of the MFP control unit according to the embodiment of the present invention.

The detailed arrangement of the MFP control unit shown in FIG. 2 is made up of mainly four parts: an input device management unit 201 which manages an input device, an input job control unit 202 which interprets an input job, an output job control unit 203 which arranges various types of setting information on a job, and an output device management unit 204 which assigns an output device.

The input device management unit 201 plays a role of arranging input signals from input units (input devices) of the MFP in FIG. 1B, and determining the switching order. The input units are various building components which are connected to the MFP control unit 106 and input signals to the MFP control unit 106.

The input device management unit 201 comprises an input device control unit 201a which receives input signals via the respective input units. The input signals include signals input from outside the MFP such as a scan image signal of a paper document and PDL data from the network. In addition, the input signals include image data stored in the document management unit 111, and image data which are processed in cooperation with the RIP unit 108 and output image processing unit 109.

The input job control unit 202 comprises a protocol interpretation unit 202a and job generation unit 202b. A series of operation requests sent from the input device control unit 201a are instruction signals called commands (protocols), which are received by the input job control unit 202. The protocol interpretation unit 202a interprets an outline of operation requests, and converts it into operation procedures which can be understood in the MFP.

The job generation unit 202b generates various jobs such as a print job, scan job, PDL rasterization job, and FAX reception job on the basis of the interpretation results of the protocol interpretation unit 202a. For each generated job, a scenario representing what kind of process is performed in the MFP and where data is to be sent is defined. The job flows in the MFP in accordance with the scenario.

In the output job control unit 203, image information, and various types of setting information (generally called job tickets) on a job are created by a job analysis unit 203a, binder analysis unit 203b, document analysis unit 203c, and page analysis unit 203d.

The job analysis unit 203a analyzes details of setting information (job setting information) on an entire job, such as the name of a document to be printed, the number of print copies, designation of a delivery tray serving as an output destination, and the binder order of a job made up of a plurality of binders. The binder analysis unit 203b analyzes details of setting information (binder setting information) on an entire binder, such as setting of the bookbinding method, the stapling position, the document order of a binder made up of a plurality of documents.

The document analysis unit 203c analyzes details of setting information (document setting information) on an entire document, such as the page order of a document made up of a plurality of pages, designation of double-sided printing, and addition of a cover sheet or slip sheet. The page analysis unit 203d analyzes details of setting information (page setting information) on various setting pages, such as the image resolution and image orientation (landscape/portrait). When PDL data is input, the RIP unit 108 is called to perform a rasterization process. In generating image information, the RIP unit 108 is called to generate page image information in the rasterization process. The page image information is compressed by the compression and decompression unit 110, and stored in the document management unit 111 in association with various types of setting information.

The output device management unit 204 comprises an output device control unit 204a and device assignment unit 204b. Page image information saved in the document management unit 111 is decompressed by the compression and decompression unit 110, and read out together with various types of setting information associated with the page image information. Various types of setting information and page image information are transmitted in pairs to the output device management unit 204.

The device assignment unit 204b plays a role of arbitrating contention because contention occurs between output units (output devices) when a plurality of jobs perform their processes at the same time in assigning output devices on the basis of the defined scenarios of the respective jobs. The output device control unit 204a schedules output units such as the printer unit 113 and post processing unit 114 for use.

As an example of the MFP, the structure of a 4D color-MFP will be explained with reference to FIG. 3.

Figure 3:
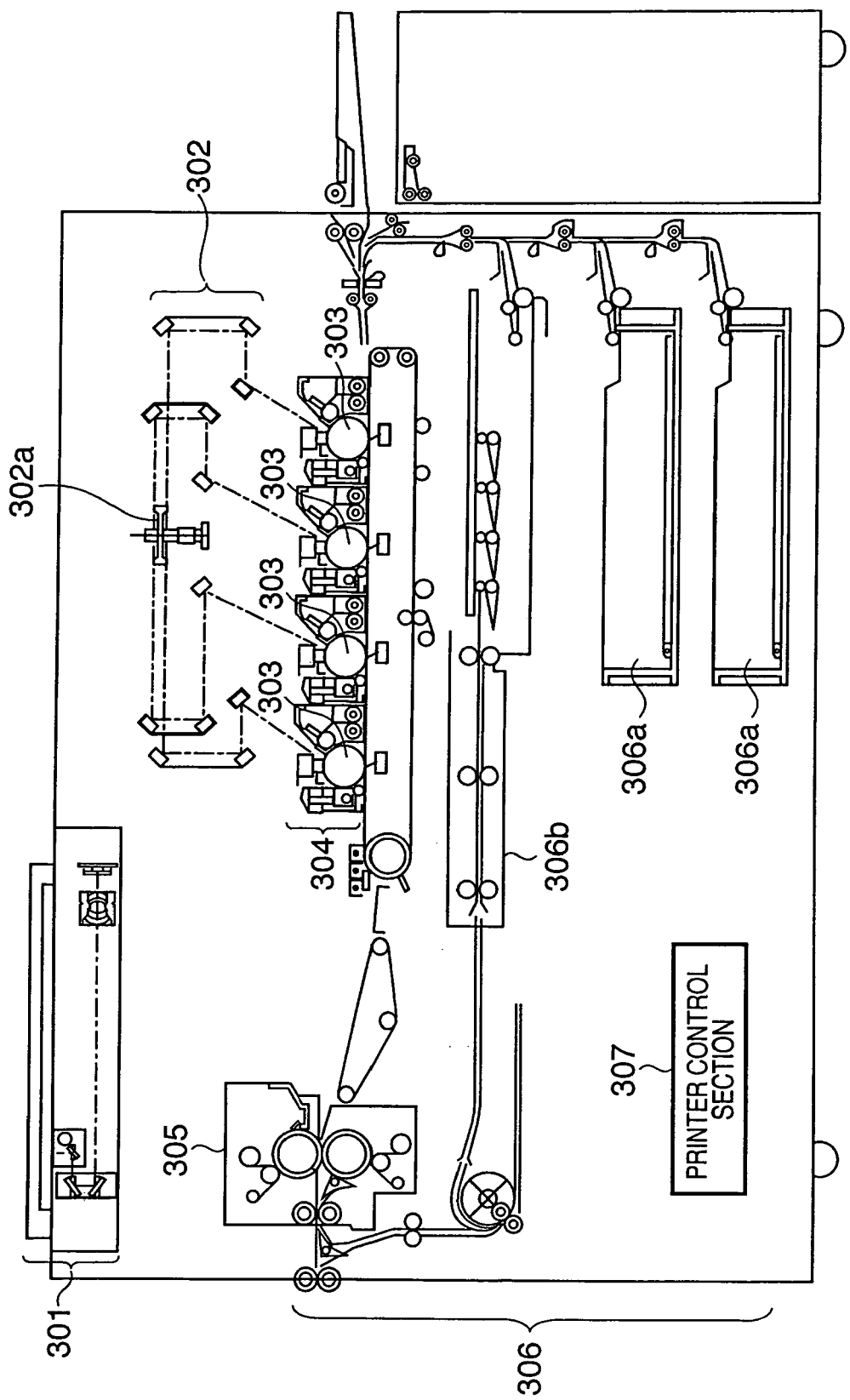
FIG. 3 is a sectional view showing the structure of a 4D color MFP according to the embodiment of the present invention.

FIG. 3 is a sectional view showing the structure of the 4D color MFP according to the embodiment of the present invention.

The 4D color MFP implements color printing using printing agents (e.g., toners) of four colors: cyan (C), magenta (M), yellow (Y), and black (K). The 4D color MFP is mainly formed from a scanner section 301, a laser exposure section 302, photosensitive drums 303, an image forming section 304, a fixing section 305, a sheet feed/convey section 306, and a printer control section 307 which controls these sections.

The scanner section 301 illuminates a document set on a document table, optically scans the document image, and converts the image into an electrical signal to create image data. The laser exposure section 302 emits a light ray such as a laser beam modulated in accordance with image data to a rotary polygon mirror 302a which rotates at an equiangular velocity. Then, the laser exposure section 302 irradiates the photosensitive drum 303 with the light ray as reflected scanning light.

The image forming section 304 is implemented by arranging four developing units (developing stations) for a series of electrophotographic processes. The series of electrophotographic processes includes a process of driving and rotating the photosensitive drum 303, charging it by a charger, and developing with toner a latent image formed on the photosensitive drum 303 by the laser exposure section 302. The series of electrophotographic processes also includes a process of transferring the toner image onto a print sheet (also called a sheet), and recovering a small amount of toner which is not transferred and remains on the photosensitive drum 303.

The four developing units which are arranged in an order of cyan (C), magenta (M), yellow (Y), and black (K) execute an image forming operation sequentially by the magenta, yellow, and black developing units a predetermined time after the start of image formation by the cyan developing unit. Under the timing control, a full-color toner image is transferred onto a sheet without any color misregistration.

The fixing section 305 is formed from a combination of rollers and belts. The fixing section 305 incorporates a heat source such as a halogen heater, and fuses and fixes by heat and pressure the toner on the sheet on which the toner image is transferred by the image forming section 304.

The sheet feed/convey section 306 has at least one sheet stocker 306a typified by a sheet cassette or paper deck. The sheet feed/convey section 306 separates one of sheets stored in the sheet stocker 306a in accordance with an instruction from the printer control section 307, and conveys the sheet to the image forming section 304 and fixing section 305. Toner images of the respective colors are transferred onto the conveyed sheet by the above-described developing units, finally forming a full-color toner image on the sheet. To form images on the two sides of the sheet, the sheet having passed through the fixing section 305 is controlled to pass through a double-sided convey path 306b extending to the image forming section 304.

The printer control section 307 communicates with the MFP control unit 106 (FIG. 1B) for controlling the whole MFP, and executes control in accordance with an instruction from the MFP control unit 106. Also, while the printer control section 307 manages the statuses of the scanner section 301, laser exposure section 302, image forming section 304, fixing section 305, and sheet feed/convey section 306, it instructs them to keep the balance and operate smoothly.

The sheet having passed through the fixing section 305 passes through an image reading sensor unit on the convey path, and the image reading sensor unit reads image data printed on the sheet. The read image data is used for, e.g., measurement of the density of an output image and checking to confirm whether the output image is normal.

The detailed arrangement of the RIP-unit 108 will be described with reference to FIG. 4.

Figure 4:
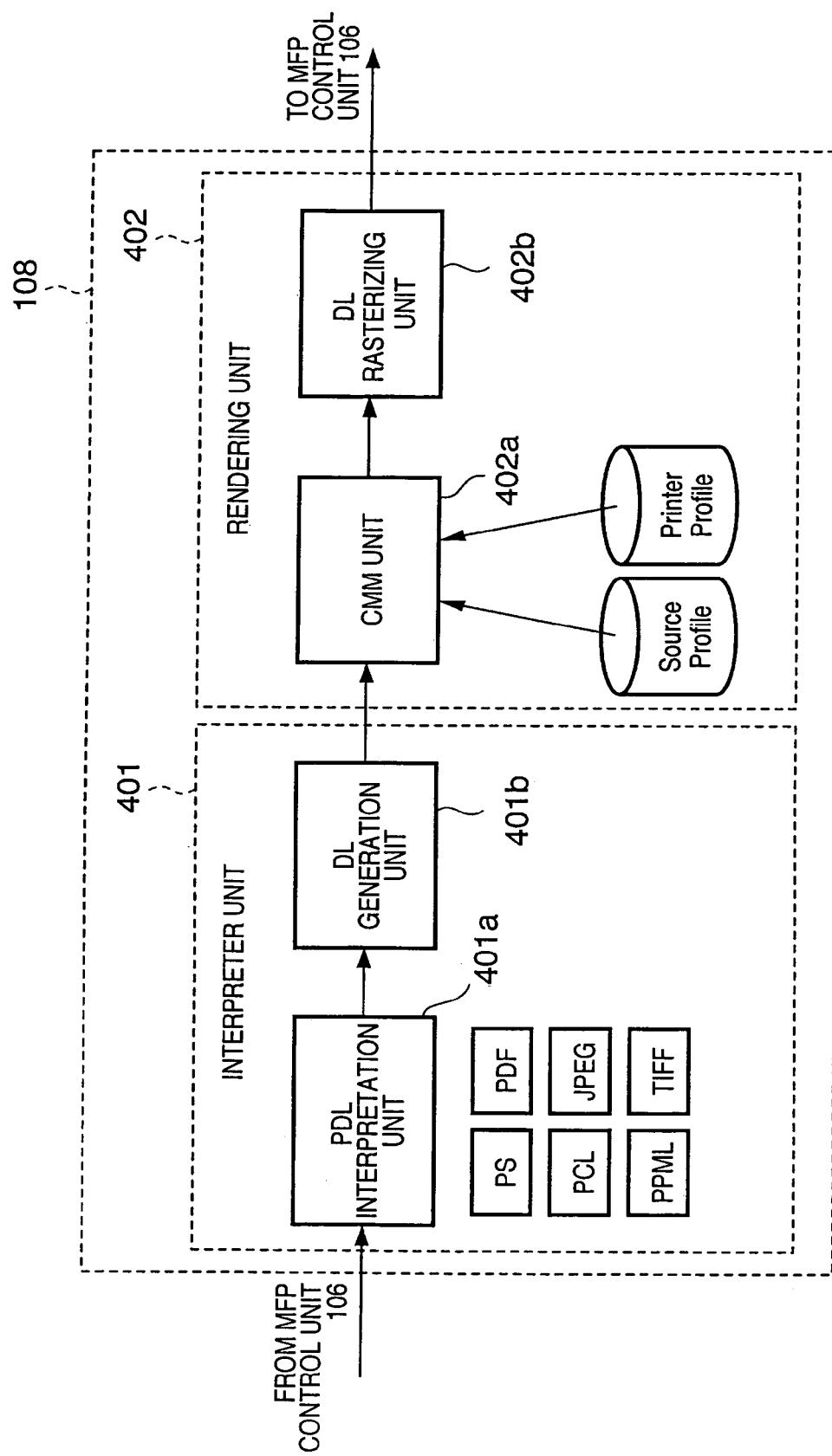
FIG. 4 is a block diagram showing the detailed arrangement of a RIP unit according to the embodiment of the present invention.

FIG. 4 is a block diagram showing the detailed arrangement of the RIP unit according to the embodiment of the present invention.

The RIP is a processor for simultaneously reproducing vector information (e.g., a character, line art, or figure) described in PDL, and object information such as image scan line information (e.g., a color, pattern, or photo) on a page. More specifically, the RIP bitmaps each object image (into a raster image) in the memory. The RIP has conventionally been mounted as hardware on the output device side, but at present, can be implemented by software along with an increase in CPU speed.

The RIP unit 108 is generally formed from two parts: an interpreter unit 401 and rendering unit 402. The interpreter unit 401 is made up of a PDL interpretation unit 401*a* which interprets PDL data, and a DL (Display List) generation unit 401*b* which generates an intermediate file called a display list from the interpreted PDL data.

The rendering unit 402 is made up of a CMM unit 402*a* which performs color matching for the display list, and a DL rasterizing unit 402*b* which rasterizes the display list into a bitmap (raster image).

Note that the CMM stands for color Matching Module.

The PDL interpretation unit 401*a* interprets various types of input PDL data. As the input format of the PDL data, the PostScript® language available from Adobe, and the PCL (Printer Control Language) language available from HP (Hewlett-Packard) are well known. According to these languages, PDL data are described by printer control codes for creating an image of each page. The printer control codes include a picture drawing code and photographic image code in addition to a simple character code.

The PDF (Portable Document Format) which is a document display file format developed by Adobe is also frequently used in various fields. The PDL interpretation unit 401*a* targets even data of this format which is directly input to the MFP without using any driver.

In addition, a VDP (Variable Data Print) format called PPML (Personalized Print Markup Language) is available. The PDL interpretation unit 401*a* also copes with color image compression formats such as JPEG (Joint Photographic Experts Group) and TIFF (Tagged Image File Format).

The CMM unit 402*a* can receive various image data expressed in general color spaces such as grayscale, RGG, and CMYK. For data in another color space, the CMM unit 402*a* converts the data into the CMYK space using CRD (Color Rendering Dictionary), and performs color matching. The CMM unit 402*a* adjusts the color on the basis of the ICC profile.

The ICC profile has a source profile and printer profile.

The source profile is used to temporarily convert RGB (or CMYK) data into the standardized L*a*b* space, and convert the L*a*b* space again into the CMYK space suited to a target printer. At this time, the source profile is made up of an RGB profile and CMYK profile. When the input image is an RGB-based image (e.g., JPEG image, TIFF image, or an image by application software available from Microsoft), the RGB profile is selected. When the input image is a CMYK-based image (e.g., partial data by Photoshop or Illustrator available from Adobe), the CMYK profile is selected.

The printer profile is generated in accordance with the color characteristic of each printer. For an RGB-based image, Perceptual (color tint priority) or Saturation (definition priority) is preferably selected. For a CMYK-based image, Colorimetric (minimum color difference) is often selected to output an optimal image.

The ICC profile is generally formed in the lookup table form. According to the source profile, when RGB (or CMYK) data is input, it is uniquely converted into L*axb* data. To the contrary, according to the printer profile, L*a*b* data is converted into CMYK data which matches the printer.

Note that RGB data which does not require color matching is converted into CMYK data by default color conversion, outputting the CMYK data. CMYK data which does not require color matching is directly output.

Image data rasterized by the RIP unit 108 is held in the document management unit 111 via the compression and decompression unit 110.

The detailed arrangement of the output image processing unit 109 will be described with reference to FIG. 5.

Figure 5:
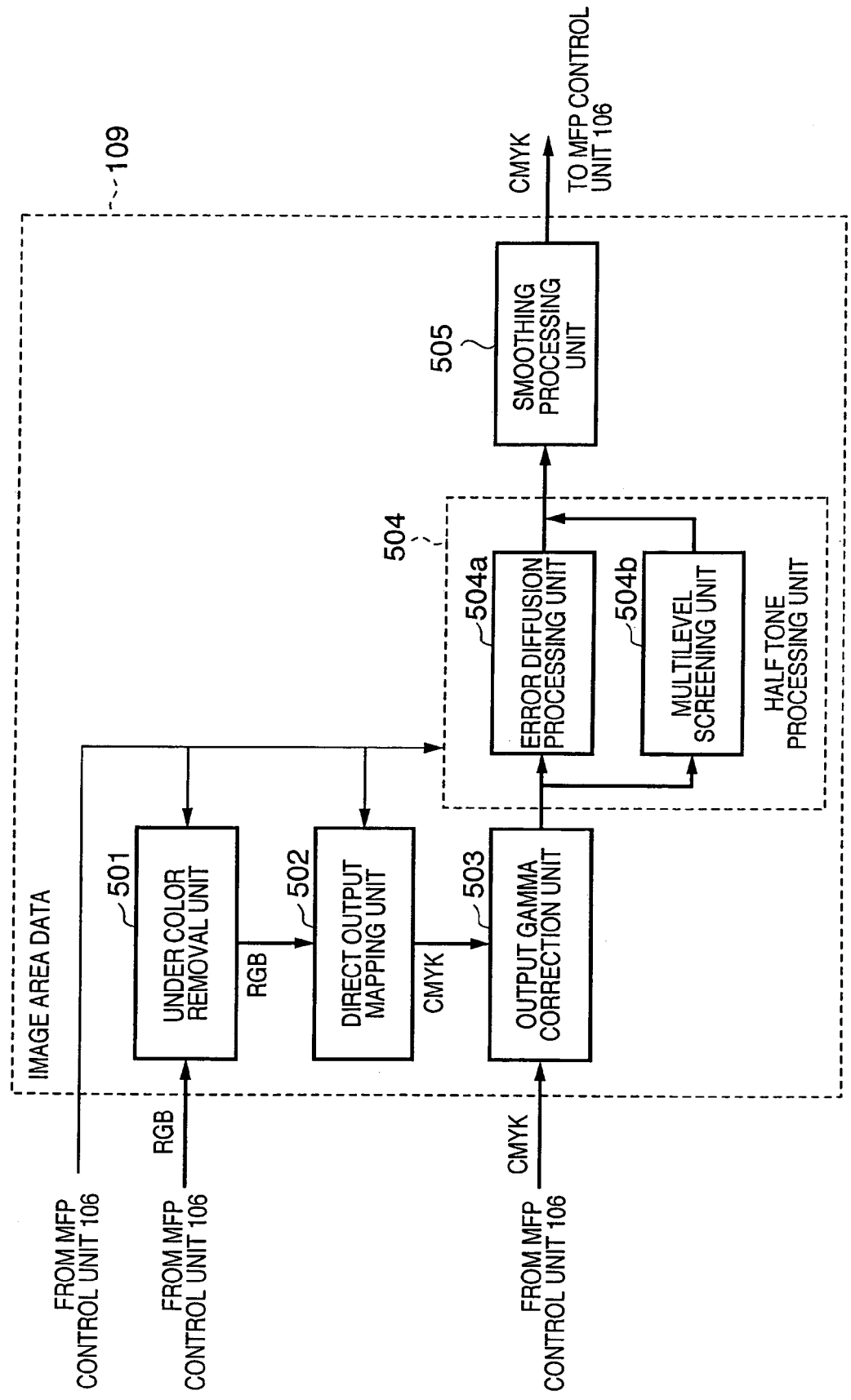
FIG. 5 is a block diagram showing the detailed arrangement of an output image processing unit according to the embodiment of the present invention.

FIG. 5 is a block diagram showing the detailed arrangement of the output image processing unit according to the embodiment of the present invention.

Image data input to the output image processing unit 109 (color system) are mainly classified into RGB-based data for processing data output from the input image processing unit 101 for a copying operation and the like, and CMYK-based data for processing data output from the RIP unit 108 for a network printing operation and the like.

Image data is input to an under color removal unit 501 in the former case, and to an output gamma correction unit 503 in the latter case.

The under color removal unit 501 executes nonlinear transformation for removing the under color from input RGB image data. A direct output mapping unit 502 converts the RGB image data into CMYK image data. In conversion, the R, G, and B values are input to the lookup table, and a C (Cyan) component is generated from the sum of the output values. Similarly, M (Magenta), Y (Yellow), and K (blacK) components are generated by the add operation on the basis of the lookup table. At this time, a three-dimensional lookup table is used on the basis of the image area data (data containing a text area, photo area, and the like obtained by an image area process) detected by the input image processing unit 101. In particular, lookup tables of different types are applied to the text area and photo area.

The output gamma correction unit 503 corrects the density of an output image in correspondence with the output unit (e.g., the printer unit 113). By using one-dimensional lookup tables for C, M, Y, and K, the output gamma correction unit 503 plays a role of maintaining the linearity of output image data that changes every image formation. The result of color calibration is reflected in the lookup table.

A half tone processing unit 504 can alternatively apply screening of a different type in accordance with the MFP function. Generally in a copying operation and the like, screening by an error diffusion processing unit 504*a* that hardly causes moiré is utilized. In a printing operation, screening by a multilevel screening unit 504*b* using a dither matrix or the like is often adopted in consideration of the reproducibility of characters and thin lines.

The former method is to weight a pixel of interest and surrounding pixels by an error filter, and distribute and correct a multilevel error while maintaining the number of tones. The latter method is to set the threshold of the dither matrix to a multilevel value, and express a pseudo half tone. According to this method, C, M, Y, and K are independently converted, and low and high LPIs (Line Per Inches) are switched depending on input image data to reproduce the image.

A smoothing processing unit 505 detects an edge for each of C, M, Y, and K by pattern matching, and converts the image into a pattern to be reproduced more smoothly, thereby reducing jaggies.

The detailed arrangement of the image forming system according to the embodiment will be described with reference to FIG. 6.

Figure 6:
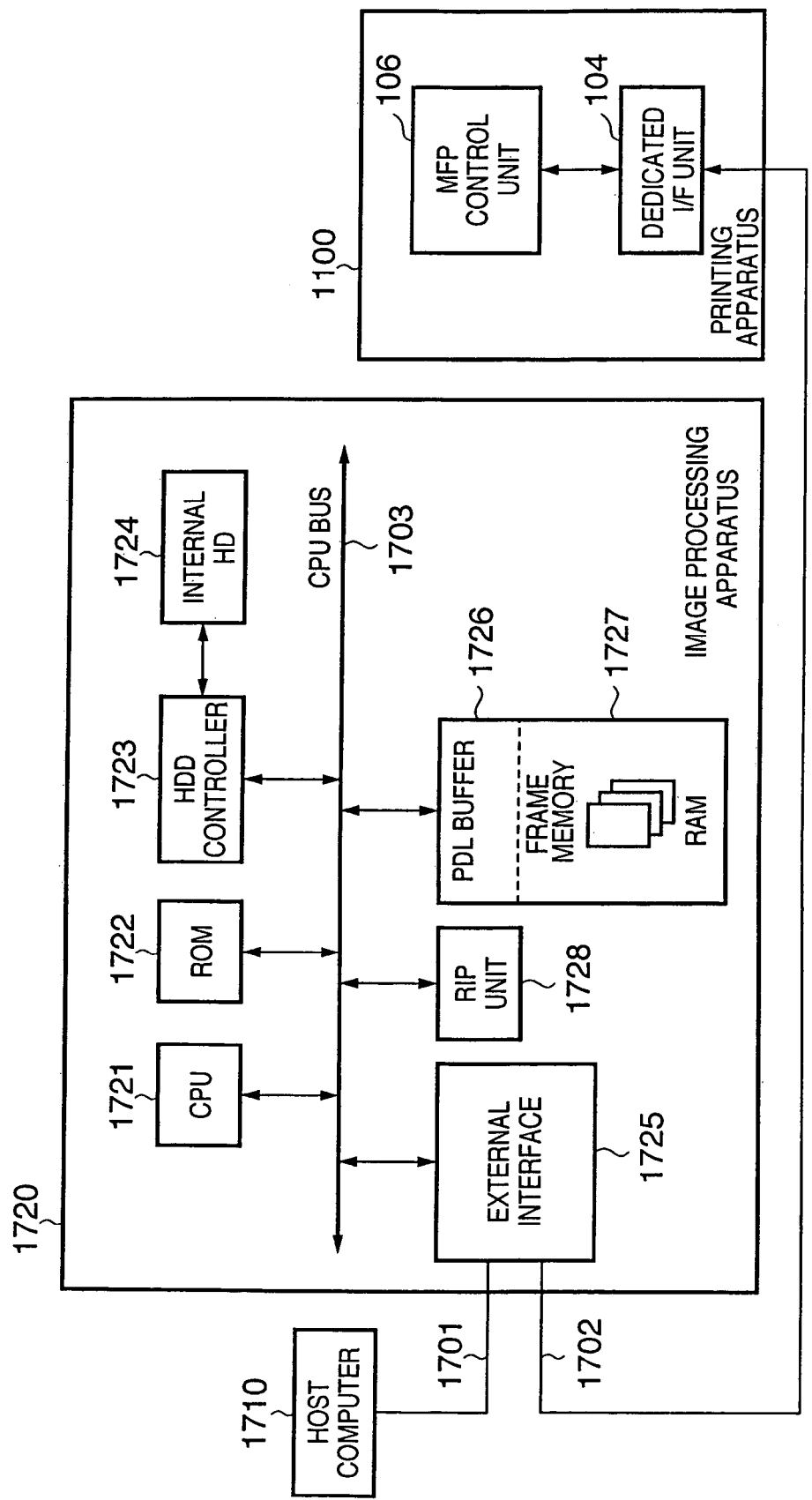
FIG. 6 is a block diagram showing the detailed arrangement of the image forming system according to the embodiment of the present invention.

FIG. 6 is a block diagram showing the detailed arrangement of the image forming system according to the embodiment of the present invention.

The image forming system shown in FIG. 6 comprises a host computer 1710, image processing apparatus 1720, and printing apparatus 1100, which are connected to each other via cables 1701 and 1702.

When applying the arrangement in FIG. 6 to that in FIG. 1A, the host computer 1710 is implemented by, e.g., the PC 2102; the image processing apparatus 1720, by, e.g., the PC 2103; and the printing apparatus 1100, by, e.g., the MFP 2105 or 2106. In this case, the PC 2103 serving as the image processing apparatus 1720 and the MFP 2105 serving as the printing apparatus 1100 may be directly connected to each other via another network in addition to the network 2101.

The printing apparatus 1100 need not be directly connected to the network 2101. For example, the image processing apparatus 1720 may be interposed between the network 2101 and the printing apparatus 1100, and the printing apparatus 1100 may be connected to the network 2101 via the image processing apparatus 1720.

The arrangement is arbitrary as far as the image processing apparatus 1720 can internally perform an image process for print data supplied from an external device, and then supply the processed print data to the printing apparatus 1100.

The host computer 1710 functions as a supply source of print data (to be described as PDL data in this example). The image processing apparatus 1720 temporarily holds, in an internal HD 1724 via a HDD controller 1723, print data supplied from the host computer 1710 via the cable 1701 and an external interface 1725.

The HDD stands for a hard disk drive, and the HD stands for a hard disk.

The print data held in the internal HD 1724 is temporarily held in a PDL buffer 1726 via a CPU bus 1703. In the image processing apparatus 1720, a RIP unit 1728 rasterizes, in a frame memory 1727, the PDL data held in the PDL buffer 1726, generating image data.

The image data rasterized in the frame memory 1727 is transferred to the printing apparatus 1100 via the cable 1702, and printed on a print medium. The cables 1701 and 1702 may be general-purpose cables (e.g., parallel cable, SCSI cable, serial (USB, RS-232C, or the like) cable, or network cable), or dedicated cables.

The printing apparatus 1100 functions as a printer for outputting print data generated by the host computer 1710, and as a copying machine and scanner for copying a document.

The image processing apparatus 1720 can acquire status information of the printing apparatus 1100 or the like via the cable 1702, and transmit the status information to the host computer 1710. In addition, the image processing apparatus 1720 can control the printing apparatus 1100 on the basis of the status information. From another viewpoint, the image processing apparatus 1720 functions as a print server for controlling printing of the printing apparatus 1100.

A CPU 1721 operates on the basis of a control program stored in a ROM 1722, and controls various building components of the image processing apparatus 1720. The internal HD 1724 has, for example, an area for temporarily holding printed PDL data and image data generated by rasterizing PDL data, and an area for storing font data. The internal HD 1724 is connected to the CPU bus 1703 via the HDD controller 1723.

The PDL buffer 1726 temporarily holds PDL data received from the host computer 1710. The frame memory 1727 temporarily holds PDL data rasterized by the RIP unit 1728. The buffer and memory are reserved in, e.g., a predetermined area in the RAM.

The ROM 1722 is effectively formed from, e.g., a programmable memory (e.g., EEPROM) to install a control program from the host computer 1710 or the like. Alternatively, for example, the ROM 1722 is effectively formed from a memory medium (e.g., Floppy® disk or CD-ROM), its controller (driver), and the like. Note that the memory medium itself (e.g., the ROM 1722) which stores a control program readable by the CPU 1721 constitutes an invention in law.

In the image processing apparatus 1720, the RIP unit 1728 generates full-color or grayscale image data in accordance with PDL data supplied from the host computer 1710. The detailed arrangement of the RIP unit 1728 is the same as that of the RIP unit 108 (FIG. 4) of the MFP.

Image data is transmitted to the printing apparatus 1100 via the cable 1702. The printing apparatus 1100 outputs an image on a print medium as described with reference to FIG. 3 on the basis of the image data supplied from the image processing apparatus 1720.

The printing apparatus 1100 also has an arrangement of analyzing job setting information from a print job by the MFP control unit 106 and rasterizing image data by the RIP unit 108. With this arrangement, the printing apparatus 1100 can implement the above-described process in the image processing apparatus 1720.

The embodiment will describe a process in an arrangement of causing an apparatus (image processing apparatus 1720) different from the printing apparatus 1100 to analyze job setting information and rasterizing image data. This arrangement can reduce the process burden on the printing apparatus 1100, and is effective particularly when many PCs exist on the network and various print jobs generated from these PCs are executed by the single printing apparatus 1100.

The process sequence of a print job in the image processing apparatus 1720 will be explained with reference to FIG. 7.

Figure 7:
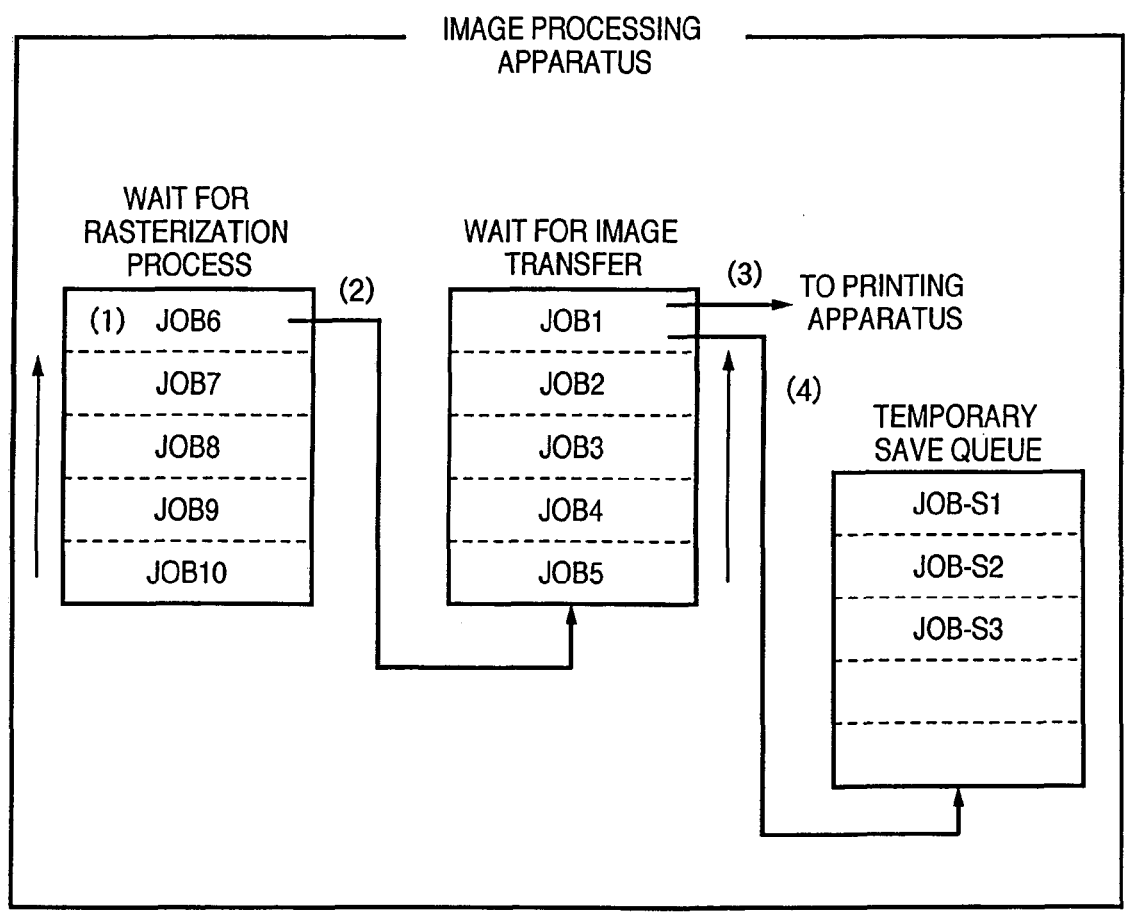
FIG. 7 is a view showing the process sequence of a print job in the image processing apparatus according to the embodiment of the present invention.

FIG. 7 is a view showing the process sequence of a print job in the image processing apparatus according to the embodiment of the present invention.

In the image processing apparatus 1720, the CPU 1721 performs a desired analysis process such as job setting for a print job input from a PC such as the host computer 1710, and then the RIP unit 1728 executes an image data rasterization process. JOB 6 ((1)) in FIG. 7 is a job during the rasterization process, and subsequent JOB 7 to JOB 10 wait for the rasterization process after the end of an analysis process.

Upon completion of the rasterization process, for example, the image data changes to an image transfer standby state ((2)). The CPU 1721 transfers the image data to the printing apparatus 1100. JOB 1 in FIG. 7 is during image transfer ((3)), and JOB 2 to JOB 5 wait for image transfer upon completion of the rasterization process. At this time, data to be transferred to the printing apparatus 1100 includes image data, and job setting information necessary to print the job. The image data is input to the dedicated I/F unit 104 of the printing apparatus 1100, and the job setting information is input to the NIC unit 103.

A process when it is determined that resources necessary to print a print job are not set in the printing apparatus 1100 in turn for transferring image data corresponding to the print job will be explained.

In a general print job, the CPU 1721 transfers image data and job setting information to the printing apparatus 1100. In transfer, if the CPU 1721 determines that resources necessary to print the print job to be transferred are not set in the printing apparatus, the CPU 1721 transmits only the job setting information to the printing apparatus 1100. Image data corresponding to the job setting information is held in a temporary save queue in FIG. 7 ((4)). JOB-S1 to JOB-S3 are temporarily saved jobs. The temporary save queue is implemented by, e.g., the PDL buffer 1726.

Whether resources necessary to print the print job to be transferred are set in the printing apparatus is determined by the CPU 1721 on the basis of status information of the printing apparatus 1100 of which the printing apparatus 1100 notifies the CPU 1721. That is, the image processing apparatus 1720 always monitors status information from the printing apparatus 1100. If the image processing apparatus 1720 receives as a result of monitoring a notification representing that resources necessary to print image data saved in the temporary save queue are set in the printing apparatus, it transmits the image data to the printing apparatus 1100.

Upon reception of job setting information by the NIC unit 103, the printing apparatus 1100 analyzes the job setting information by the output job control unit 203 via the input device management unit 201 and input job control unit 202. A virtual job (reservation job) corresponding to the job setting information is held in the document management unit 111. In other words, when the image processing apparatus 1720 transmits only job setting information but does not transmit image data corresponding to the job, a job discriminated from a general job is held as a reservation job in the document management unit 111.

Note that the job setting information contains identification information for specifying corresponding image data. Thus, even if the printing apparatus 1100 separately receives job setting information and corresponding image data, it can specify image data received later by referring to identification information in the job setting information.

Prior to a description of a reservation job process by the printing apparatus, an example of the operation unit 107 will be explained with reference to FIG. 8.

Figure 8:
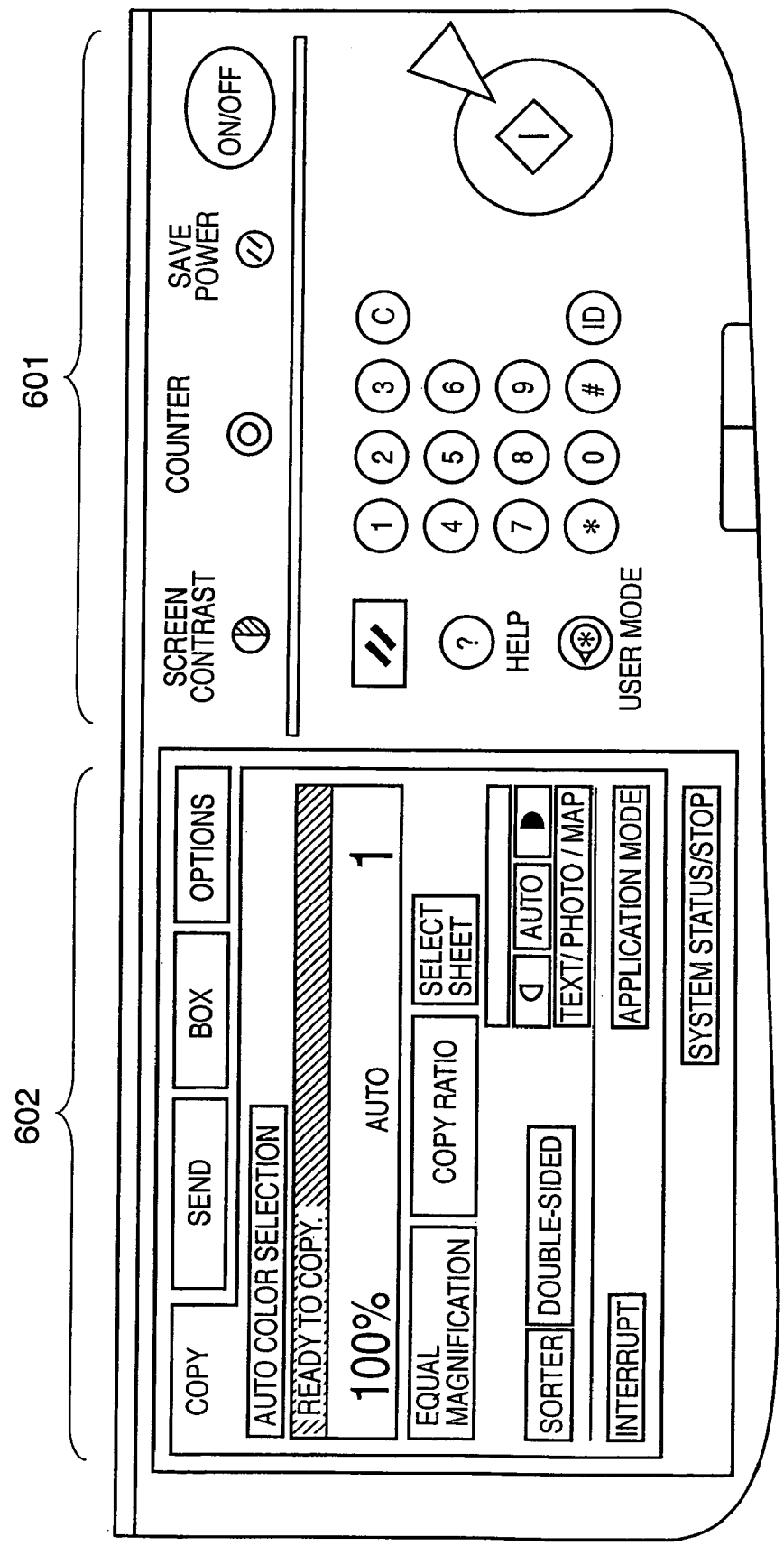
FIG. 8 is a view showing an example of an operation unit according to the embodiment of the present invention.

FIG. 8 is a view showing an example of the operation unit according to the embodiment of the present invention.

The operation unit 107 comprises a key input section 601 and touch panel section 602. Details of the key input unit 601 and touch panel section 602 are shown in FIGS. 9 and 10, and will be described below.

Figure 9:
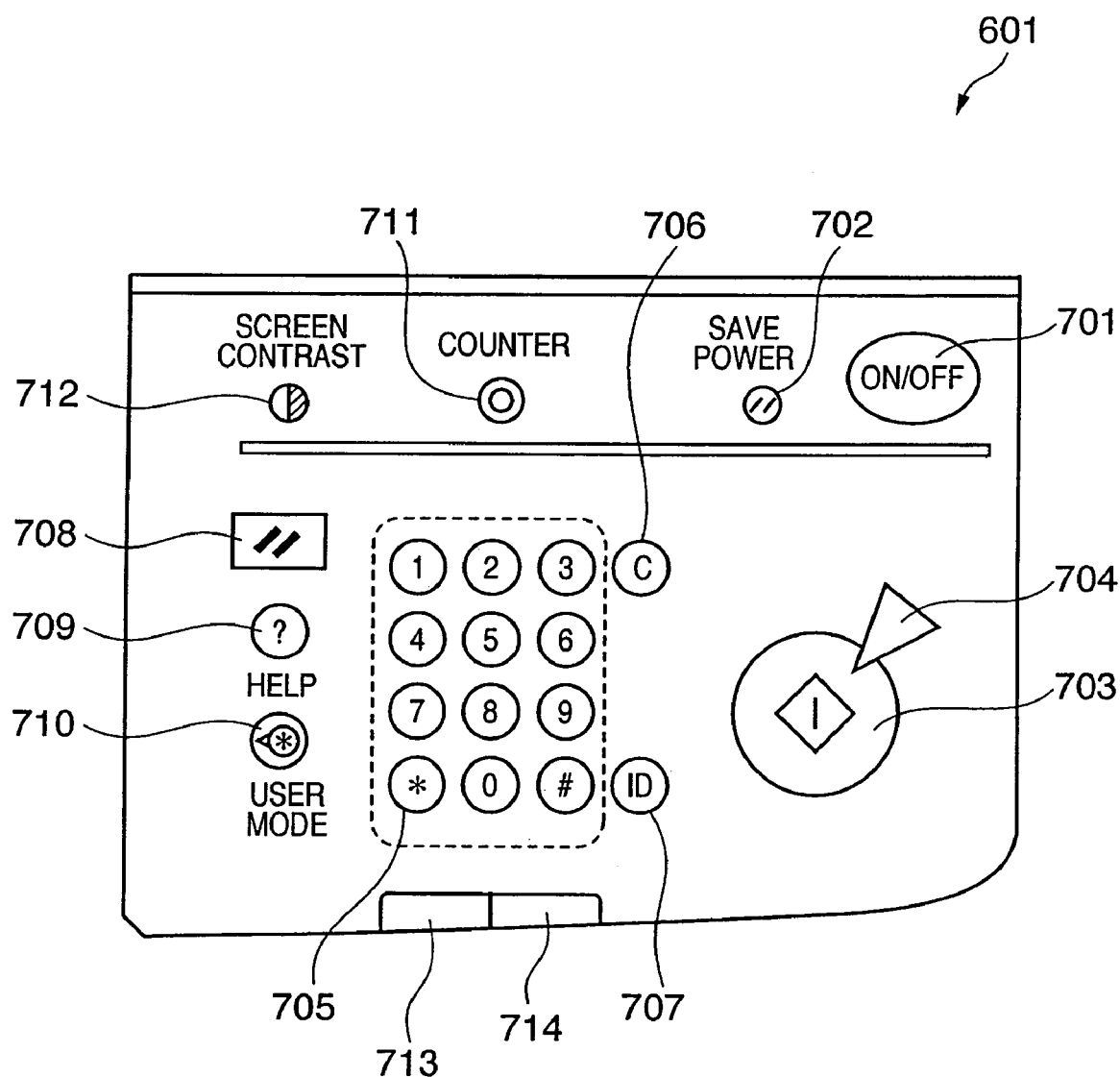
FIG. 9 is a view showing an example of a key input section according to the embodiment of the present invention.
Figure 10:
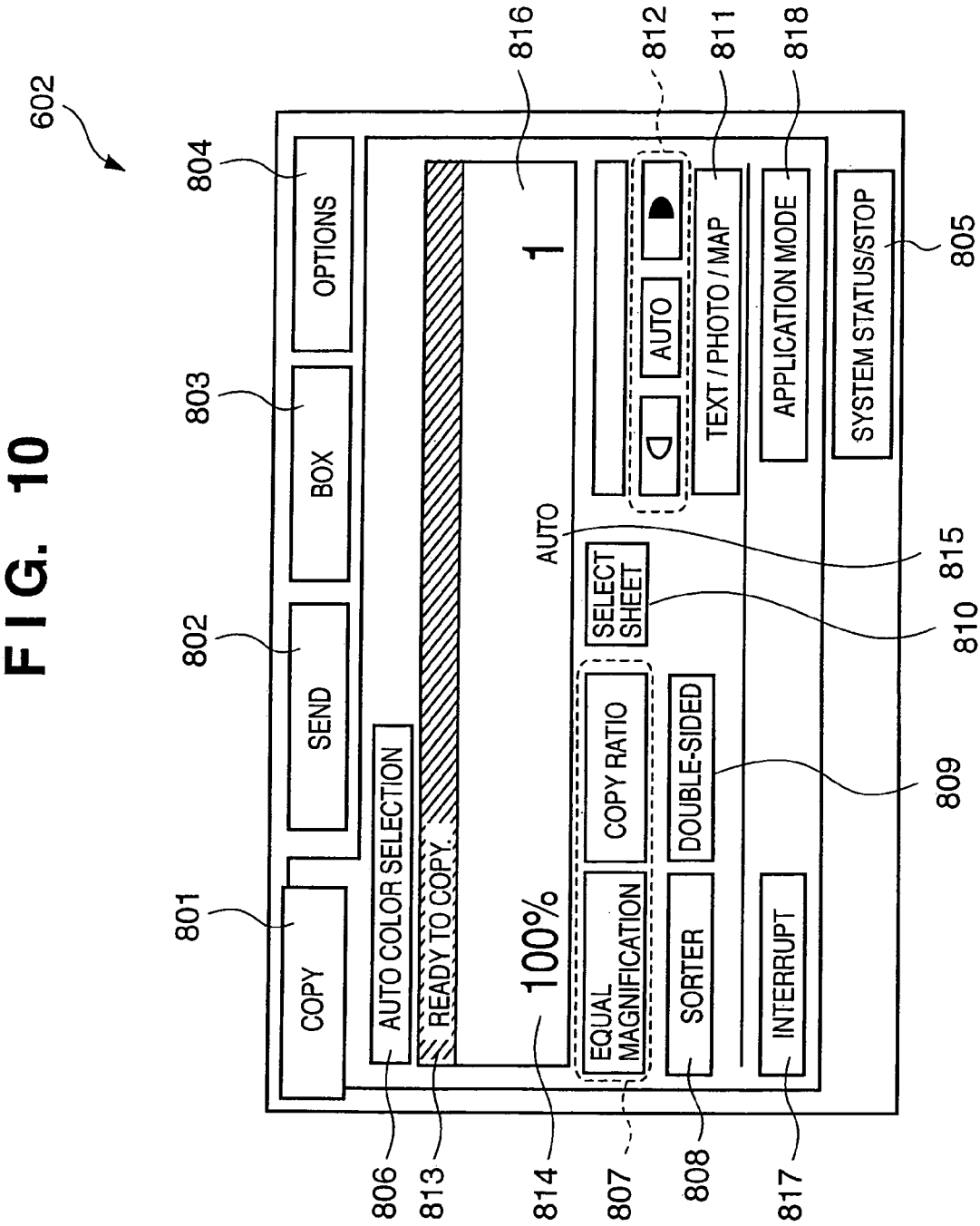
FIG. 10 is a view showing an example of a touch panel section according to the embodiment of the present invention.

The key input section 601 shown in FIG. 9 is a key input part capable of making stationary operation settings.

An operation unit power switch 701 switches between the standby mode (normal operation state) and the sleep mode (state in which the main controller stops the program while waiting for an interrupt by network printing, facsimile transmission, or the like, and suppresses power consumption). With the operation unit power switch 701, the main power switch for supplying power to the whole system can be controlled ON.

A power save key 702 is used to decrease the control temperature of the fixing section 305 (FIG. 3) in the standby mode and suppress power consumption though a long time is taken until the current state changes to a printable one. The control temperature can also be decreased by setting the power saving ratio.

A start key 703 is used to designate the start of various processes such as copying and transmission. A stop key 704 is used to interrupt the start of various processes.

A ten-key pad 705 is used to input the entries of various settings. A clear key 706 is used to cancel the entries. An ID key 707 is used to input a preset password in order to authenticate the operator of the MFP.

A reset key 708 is used to invalidate various settings and restore to default settings. A help key 709 is used to display guidance and help. A user mode key 710 is used to shift to a system setup window for each user.

A counter check key 711 is used to display an output sheet count stored in a software counter which is arranged in the MFP and counts the number of print sheets. The counter check key 711 can display an output sheet count in accordance with each of the operation mode (e.g., copy/print/scan/FAX), the color mode (e.g., color/monochrome), and the sheet size (e.g., large/small).

An image contrast dial 712 is used to adjust the screen to an easy-to-see state by controlling the backlight of the liquid crystal display of the touch panel section 602.

An execution/memory lamp 713 flickers to notify the operator of execution of a job or access to the memory. An error lamp 714 flickers upon a failure in executing a job, or an error requiring a serviceman call, or for an operator call to notify the operator of a jam, absence of consumables, or the like.

The touch panel section 602 shown in FIG. 10 is made up of an LCD (Liquid Crystal Display), and a touch panel display which is adhered onto the LCD and formed from a transparent electrode. A process of, e.g., when a transparent electrode at a portion corresponding to a key displayed on the LCD is touched with a finger, detecting the touch and displaying another operation window is programmed in advance. FIG. 10 shows an initial window in the standby mode, and various operation windows can be displayed in accordance with setting operations.

A copy tab 801 is a tab key for changing to an operation window for a copying operation. A send tab 802 is a tab key for changing to an operation window for designating a send operation such as FAX transmission or E-mail sending. A box tab 803 is a tab key for changing to an operation window for inputting/outputting a job to/from a box (storage means for storing a job for each user). An option tab 804 is a tab key for changing to a setting window for setting extended functions such as scanner setting and printer setting. By selecting these tabs, the touch panel section 602 can change to corresponding operation modes.

A system monitor key 805 is used to display the state and status of the MFP. A color selection setting key 806 is used to select color copying, monochrome copying, or auto selection in advance. A copy ratio setting key 807 is used to change to a copy ratio setting window for setting a copy ratio such as equal magnification, enlargement, or reduction. A post process setting key 808 is used to change to a post process setting window for setting whether to perform stapling or punching, the number of staples or punches, the position of the staple or punch, and the like.

A double-sided setting key 809 is used to change to a double-sided setting window for selecting single- or double-sided printing. A sheet size setting key 810 is used to change to a sheet size setting window for selecting a sheet feed stage, sheet size, and medium type. An image mode setting key 811 is used to select an image mode (e.g., text or image mode) suitable for reading of a document image. A density setting key 812 is used to adjust the density of an output image to be high or low.

A status display portion 813 provides simple status display such as standby, warm-up, jam, or error. A copy ratio display portion 814 displays a copy ratio set with the copy ratio setting key 807. A sheet size display portion 815 displays a sheet size and medium type set with the sheet size setting key 810. A sheet count display portion 816 displays a sheet count designated with the ten-key pad 705, or the number of a sheet during printing in process.

An interrupt key 817 is used when another job interrupts a copying operation. An application mode key 818 is used to change to a setting window for setting various image processes and layouts, such as two-page separation, cover sheet/slip sheet setting, reduction layout, and image movement.

A job status window for a job during printing or in wait for printing will be explained with reference to FIGS. 11A and 11B.

FIGS. 11A and 11B are views showing an example of the job status window according to the embodiment of the present invention.

Selection of the option tab 804 in the touch panel section 602 in FIG. 10 allows to display a job status window 900 (FIG. 11A) having a print tab 901 for setting a printing operation by the printer. The job status window 900 displays a job list 902 of jobs after printing, during printing, in wait for printing, and during reservation. Job information on a job including the job name, user name, and status is displayed for each job.

The job list 902 has a job status button 902a, job log button 902b, and reservation job status button 902c. When the job status button 902a is operated, the job list 902 displays job information on a job during printing or in wait for printing. When the job log button 902b is operated, the job list 902 displays job information on a printed job. When the reservation job status button 902c is operated, the job list 902 displays job information on a job during reservation. Details of a job during reservation (reservation job) will be described later.

The display state in FIG. 11A shows a case of operating the job status button 902a.

In FIG. 11A, two jobs "print job 4.doc" and "print job 6.xls" in the job list 902 are displayed (highlighted) in a list background color different from that of the remaining jobs. The different background color shows that this job is a reservation job for which only job setting information is received and no corresponding image data is received.

If a "save selected job" button 903 is operated while these two jobs are selected, the two reservation jobs are temporarily moved and held in the document management unit 111 (FIG. 2). FIG. 11B shows the job status window 900 after the two reservation jobs are saved with the "save selected job" button 903 in FIG. 11A.

Control in the printing apparatus when a reservation job is saved and restored will be explained with reference to FIGS. 1B and 2.

The job analysis unit 203a analyzes job setting information of a job input to the output job control unit 203. The job is processed by the binder analysis unit 203b, document analysis unit 203c, and page analysis unit 203d, and if necessary, sent to the RIP unit 108.

In the embodiment, the image processing apparatus 1720 rasterizes image data of the job, which is then input to the printing apparatus 1100. Thus, a process by the RIP unit 108 is not substantially executed.

The compression and decompression unit 110 compresses the rasterized image data, and the document management unit 111 holds the compressed data. Before the start of printing, the MFP control unit 106 confirms whether the printing apparatus status managed by the resource management unit 112 is set as resources necessary for settings represented by the job setting information Analyzed by the job analysis unit 203a.

Note that the printing apparatus status includes the size and type of a print sheet set in the sheet stocker, and the mounting state of an optional device. Resources for executing printing mean various resources necessary to print by the printing apparatus. More specifically, the resources are the print sheet (also including the sheet size and sheet type) used for printing, the printing agent (toner), post process functions (e.g., punching and stapling), and the memory capacity.

When printing can start, the compression and decompression unit 110 decompresses the job held in the document management unit 111, and the output device management unit 204 controls printing. If image data corresponding to the received job'setting information has not been received yet when the turn for the process comes, the print job is temporarily saved as a reservation job in the document management unit 111 under the control of the MFP control unit 106. When there is a subsequent printable job which waits for printing, a printing process for the job starts.

When receiving corresponding rasterized image data, the MFP control unit 106 resumes printing the reservation job temporarily saved in the document management unit 111.

The resource management unit 112 always monitors the printing apparatus status. When the resource management unit 112 detects as a result of monitoring that resources necessary to print the reservation job temporarily saved in the document management unit 111 are set, the MFP control unit 106 notifies the image processing apparatus 1720 of a message to this effect.

A window (user mode setting window) for making reservation job process setting for setting a reservation job processing method, and restore condition setting to resume printing of a reservation job will be explained with reference to FIGS. 12A and 12B.

Figure 12A:
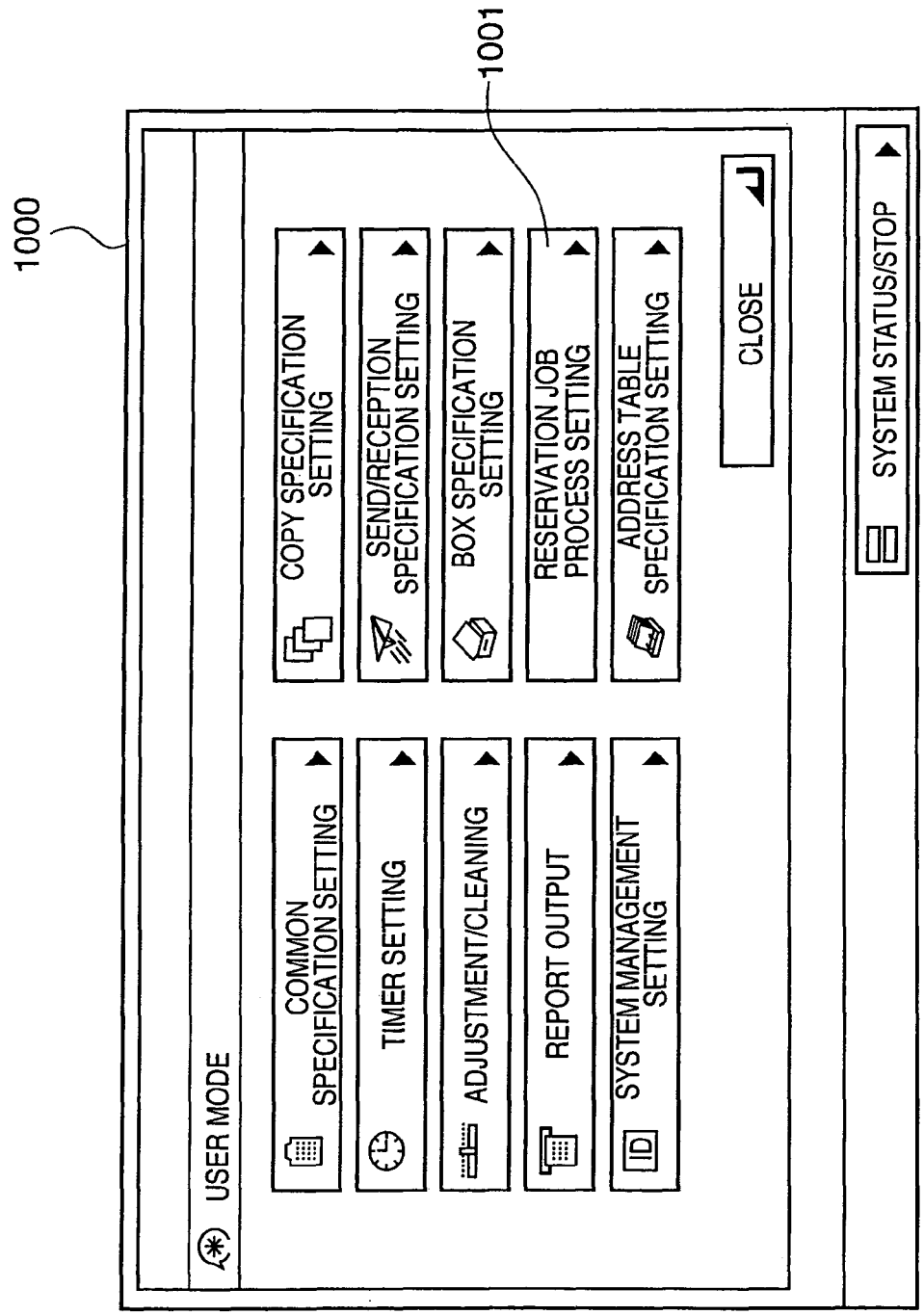

FIGS. 12A and 12B are views showing an example of the user mode setting window according to the embodiment of the present invention.

A user mode setting window 1000 shown in FIG. 12A is displayed when the user mode key 710 in the key input section 601 of FIG. 9 is pressed. The user mode setting window 1000 is equipped with buttons for making various settings on the MFP. These buttons include, for example, a common specification setting button, a timer setting button, a copy specification setting button, and a reservation job process setting button 1001.

Pressing the reservation job process setting button 1001 makes it possible to display a reservation job process setting window 1010 shown in FIG. 12B. The reservation job process setting window 1010 allows setting a condition (restore condition) for resuming printing of a temporarily saved job as a reservation job.

A plurality of setting items are prepared as setting items of the reservation job process setting window 1010, and each setting item can be selected with a check box control. That is, an arbitrary combination of setting items can be simultaneously set with check box controls.

As shown in FIG. 12B, an example of the setting items is "restore a job to its turn in reservation." This means that, when printing of a reservation job saved in the document management unit 111 resumes, the reservation job is restored to its turn in reservation.

In FIG. 12B, setting items for restoring a reservation job at the end of the current job list, or restoring the reservation job so as to print it preferentially next to a job during printing are prepared in addition to the setting item "restore a job to its turn in reservation." These setting items are merely examples, and various setting items can be prepared in accordance with the application purpose.

As the restore condition, it can be set whether to automatically resume a printing process for a reservation job when the printing apparatus receives image data corresponding to the reservation job, or resume the printing process when resume of printing is manually designated. It is possible to achieve this setting by operating an "auto restore" button 1011 or "manual restore" button 1012. In FIG. 12B, the "manual restore" button 1012 is designated.

Note that pieces of setting information (pieces of restore condition setting) set in the setting windows shown in FIGS. 12A and 12B are stored in, e.g., the resource management unit 112, and read out, as needed.

A window for confirming the reservation job status will be explained with reference to FIG. 13.

Figure 13:
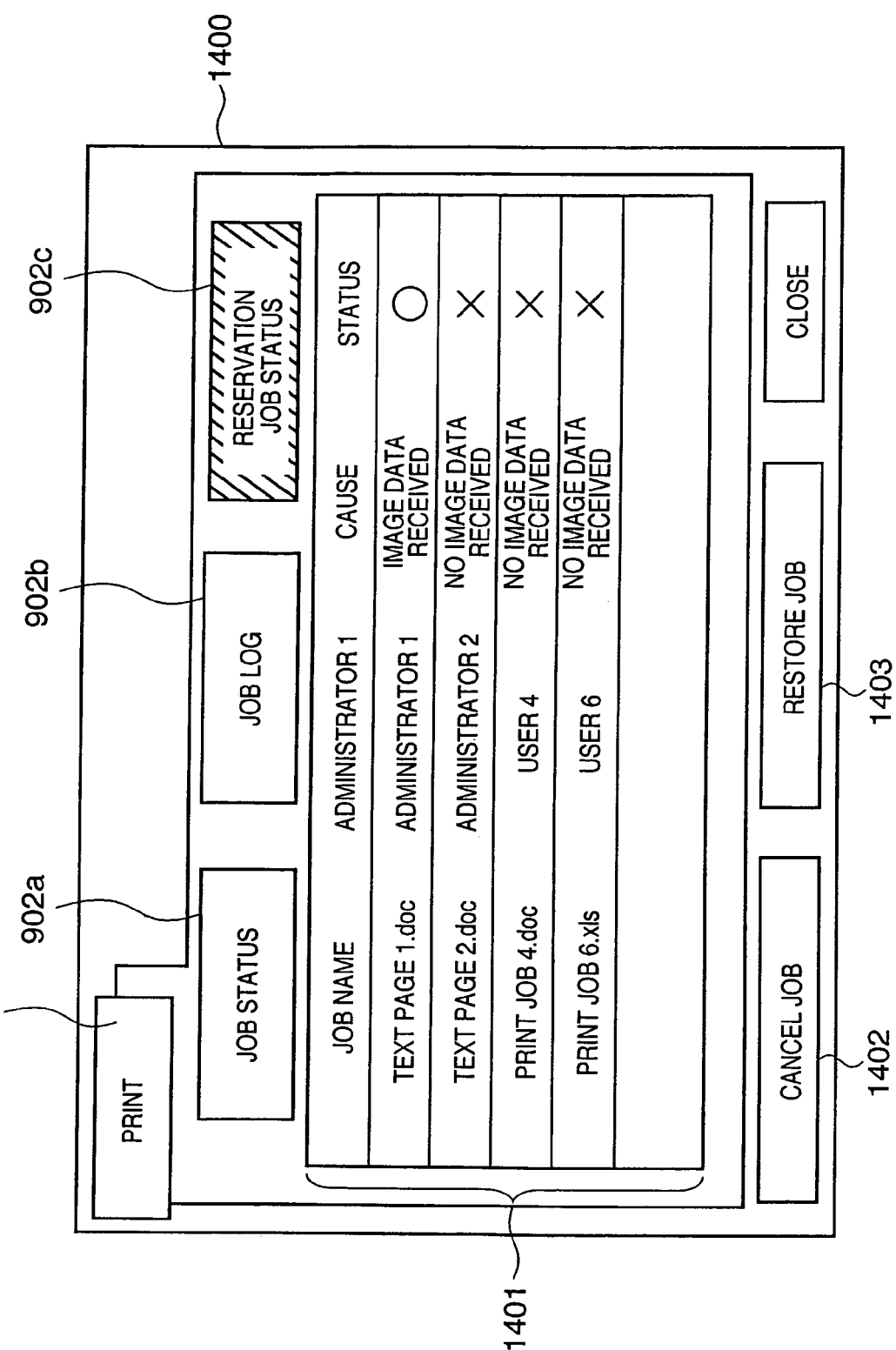
FIG. 13 is a view showing an example of a reservation job status window according to the embodiment of the present invention.

FIG. 13 is a view showing an example of a reservation job status window according to the embodiment of the present invention.

A reservation job status window 1400 shown in FIG. 13 is displayed when the reservation job status button 902c in the job status window of FIG. 11A is pressed. The reservation job status window 1400 displays a reservation job list 1401 serving as a job list of reservation jobs temporarily saved in the document management unit 111. The reservation job list 1401 displays job information on each job, such as the job name, job administrator, printing interruption cause, and restorable status (no image data received/image data received).

When the restore status of an arbitrary job in the job list is o (restorable), a "restore job" button 1403 is pressed while the job is selected. With this operation, printing of the print job can be manually resumed. If automatic restore is designated as the restore condition, printing of a reservation job resumes after the reservation job to be processed is restored.

Pressing a "cancel job" button 1402 allows to cancel printing of a temporarily saved reservation job.

A print job transmission process by the image processing apparatus 1720 will be explained with reference to FIG. 14.

Figure 14:
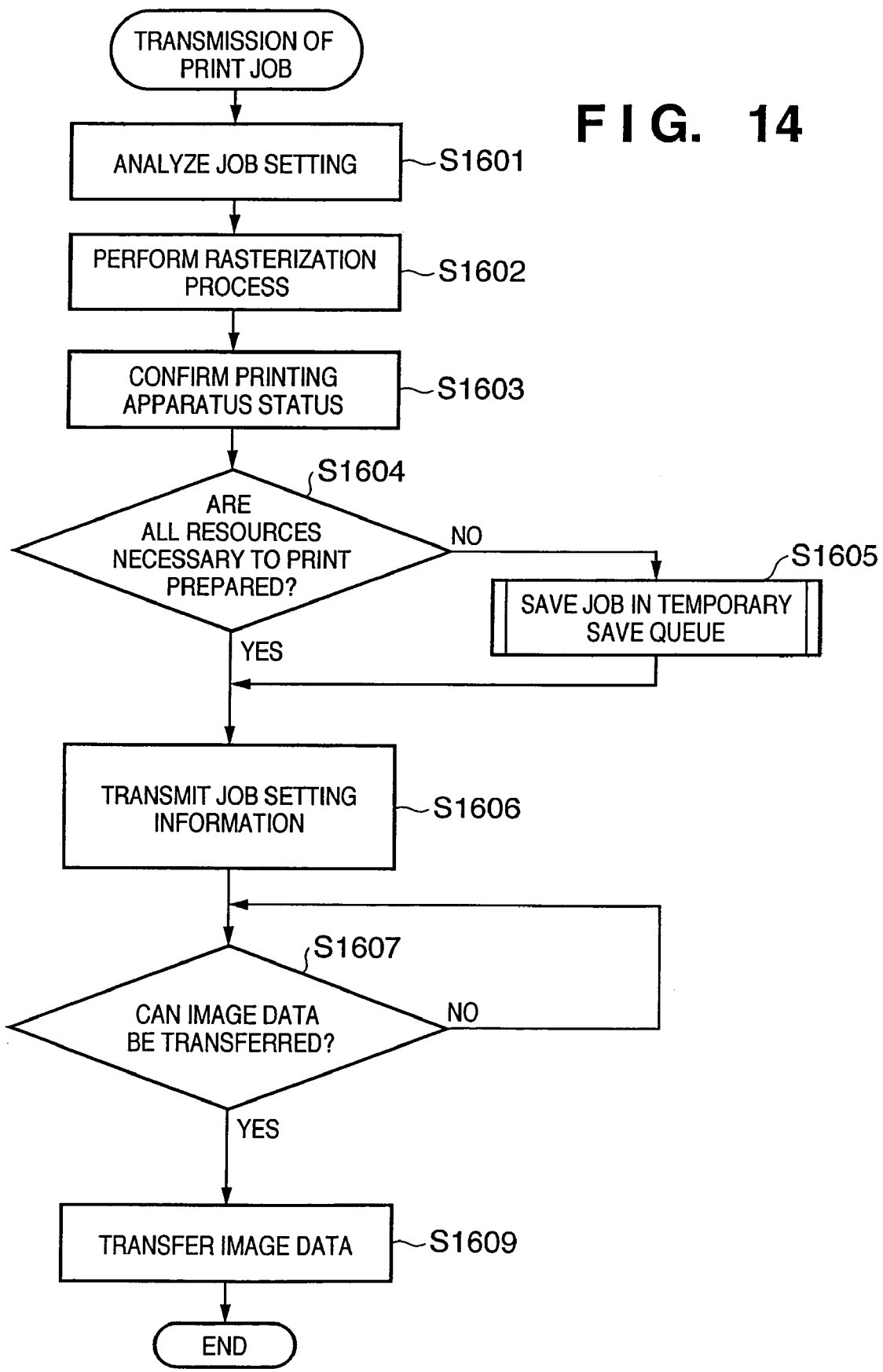
FIG. 14 is a flowchart showing a print job transmission process according to the embodiment of the present invention.

FIG. 14 is a flowchart showing the print job transmission process according to the embodiment of the present invention.

Note that the CPU 1721 controls to implement the transmission process.

After a print job is received from an external device, the CPU 1721 analyzes job setting information (step S1601). After the end of analyzing the job setting information, the RIP unit 1728 rasterizes image data on the basis of the analyzed job setting information (step S1602).

Upon completion of the rasterization process, the CPU 1721 confirms the printing apparatus status (step S1603). Based on the confirmation result, the CPU 1721 determines whether all resources necessary to print a target print job are prepared in the printing apparatus (step S1604). If not all necessary resources are prepared (NO in step S1604), the CPU 1721 saves image data of the print job in the temporary save queue (step S1605). Then, the CPU 1721 transmits only job setting information of the print job to the printing apparatus 1100 via the external interface 1725 (step S1606).

If all necessary resources are prepared (YES in step S1604), the CPU 1721 transmits the job setting information of the print job to the printing apparatus 1100 via the external interface 1725, and corresponding image data waits for transfer (step S1606).

The image data which waits for transfer stands by until its turn for transfer comes. If the turn for transfer comes, the CPU 1721 determines whether the image data can be transferred (step S1607). If no image data can be transferred (NO in step S1607), the CPU 1721 waits until transfer becomes possible. If the image can be transferred (YES in step S1607), the CPU 1721 executes transfer of the image data (step S1609).

The image processing apparatus 1720 always monitors status information from the printing apparatus 1100. If the image processing apparatus 1720 receives as a result of monitoring a notification representing that resources necessary to print the image data saved in the temporary save queue are set in the printing apparatus, it transmits, to the printing apparatus 1100, the image data saved in the temporary save queue.

In the embodiment, when not all resources necessary to print a target print job are prepared in the printing apparatus 1100, corresponding image data is saved in the temporary save queue. However, the present invention is not limited to this configuration. For example, when absence of resources such as absence of sheets is assumed to be canceled relatively early, image data may be directly transmitted to the printing apparatus 1100 without saving the image data in the temporary save queue.

Figure 15:
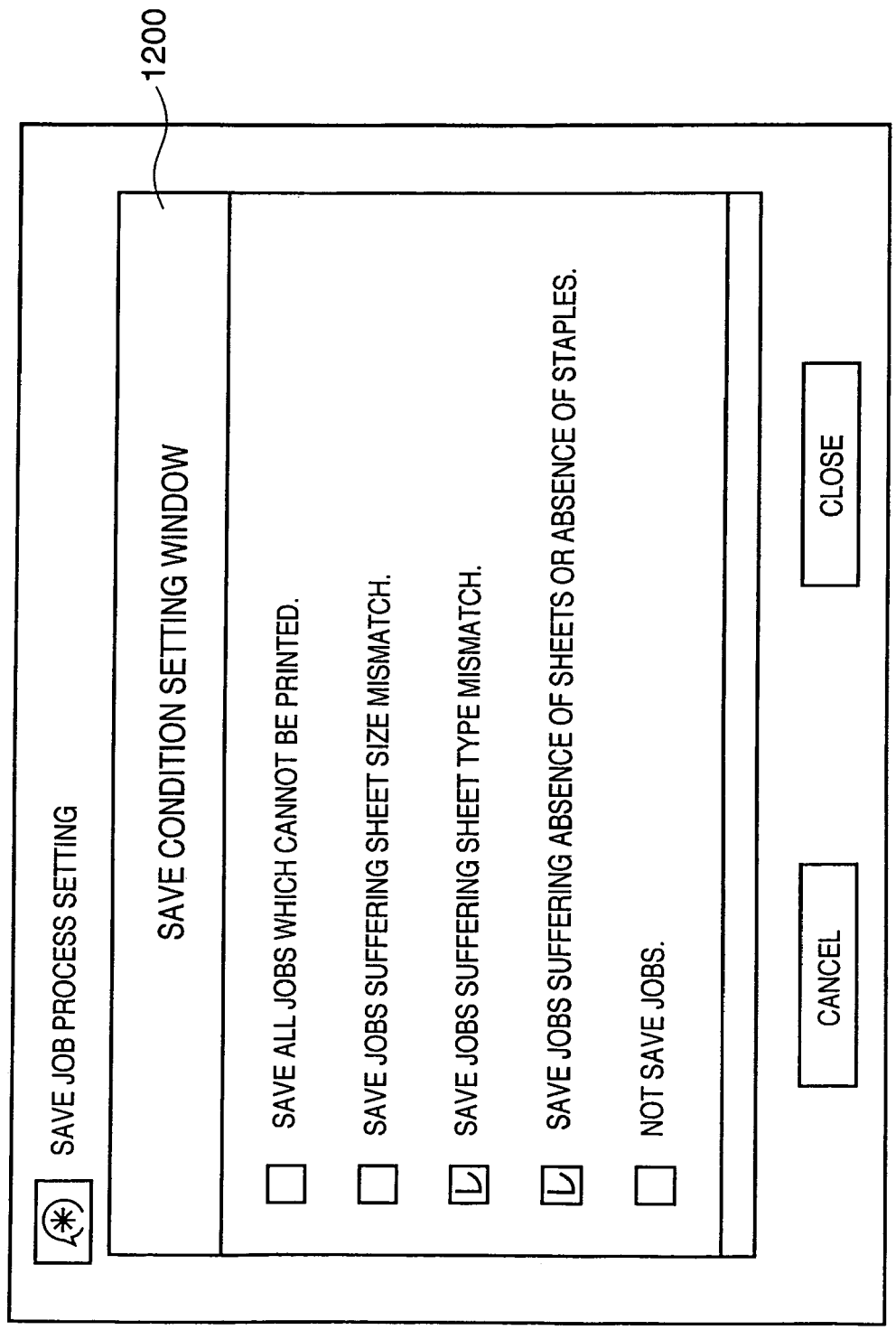
FIG. 15 is a view showing an example of a save condition setting window according to the embodiment of the present invention.

In addition, a save condition setting window (FIG. 15) for setting save conditions representing whether to save image data may be arranged. Only when save conditions set in the save condition setting window are satisfied, image data may be saved in the temporary save queue. In this case, conceivable setting items in save conditions are mismatches in sheet size and sheet type or absence of sheets, in addition to "save all jobs which cannot be printed."

The save condition setting window may be provided to the printing apparatus 1100 to set save conditions in the printing apparatus 1100 for the image processing apparatus 1720.

A printing process by the printing apparatus 1100 will be explained with reference to FIG. 16.

Figure 16:
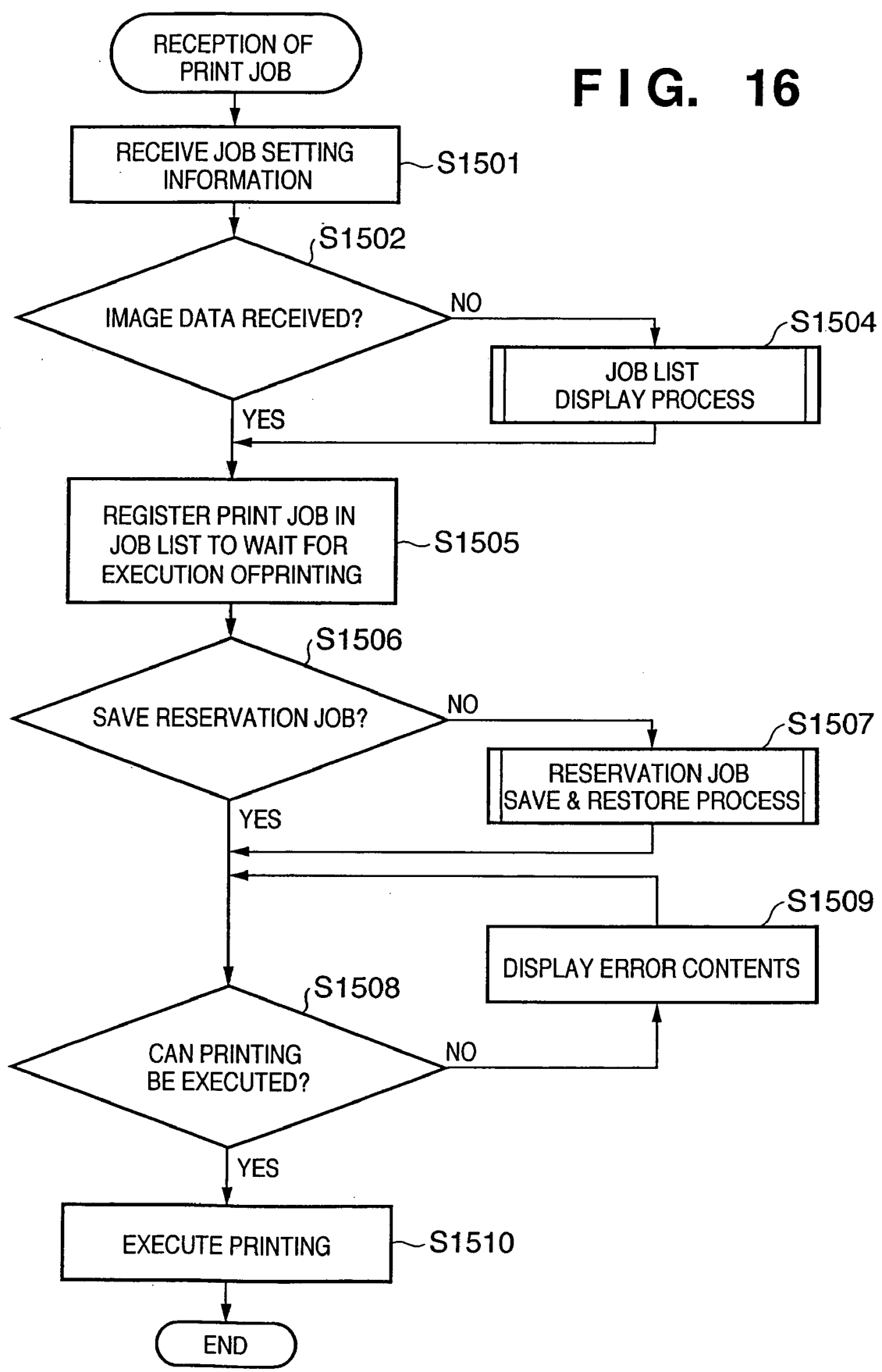
FIG. 16 is a flowchart showing a printing process according to the embodiment of the present invention.

FIG. 16 is a flowchart showing the printing process according to the embodiment of the present invention.

Note that the MFP control unit 106 controls to implement the printing process.

As a print job, the MFP control unit 106 receives job setting information (step S1501). The MFP control unit 106 determines whether image data corresponding to the received job setting information has been received. If no corresponding image data has been received (NO in step S1502), the MFP control unit 106 executes a job list display process (step S1504).

If the corresponding image data has been received (YES in step S1502), the MFP control unit 106 registers the print job in the job list to wait for execution of printing (step S1505).

Note that whether image data has been received is determined on the basis of whether the image data has been received within a predetermined period. This determination assumes a case where even image data of a job not to be reserved may not be received immediately after reception of job setting information owing to the traffic status of the network.

The print job registered in the job list waits until its turn for printing comes. When the target print job is a reservation job, the MFP control unit 106 determines whether to save the reservation job during standby (step S1506). If a save execution instruction is received (YES in step S1506), the MFP control unit 106 executes a reservation job save/restore process (step S1507).

If no save execution instruction is received (NO in step S1506), and the turn for printing a general job comes, or the reservation job is restored and its turn for printing comes, the MFP control unit 106 determines whether the target job can be printed (step S1508). If the target job can be printed (YES in step S1508), the MFP control unit 106 causes the printer unit 113 to print the print job (step S1510).

If no target job can be printed (NO in step S1508), the MFP control unit 106 displays error contents to this effect on the operation unit 107 (step S1509). For the job in the error status, the error contents are kept displayed until the error is canceled. Note that the error contents may be displayed in, e.g., a dedicated dialog. Alternatively, information representing the error status may be displayed at the item "status" of the job list 902 in the job status window 900 of FIG. 11A.

If the error is canceled and printing becomes executable, the MFP control unit 106 causes the printer unit 113 to print (step S1510); Then, the printing process ends.

If no error is canceled even upon the lapse of a predetermined time, a corresponding job may be saved as a reservation job in the document management unit 111, or simply deleted.

Details of the job list display process in step S1504 will be explained with reference to FIG. 17.

Figure 17:
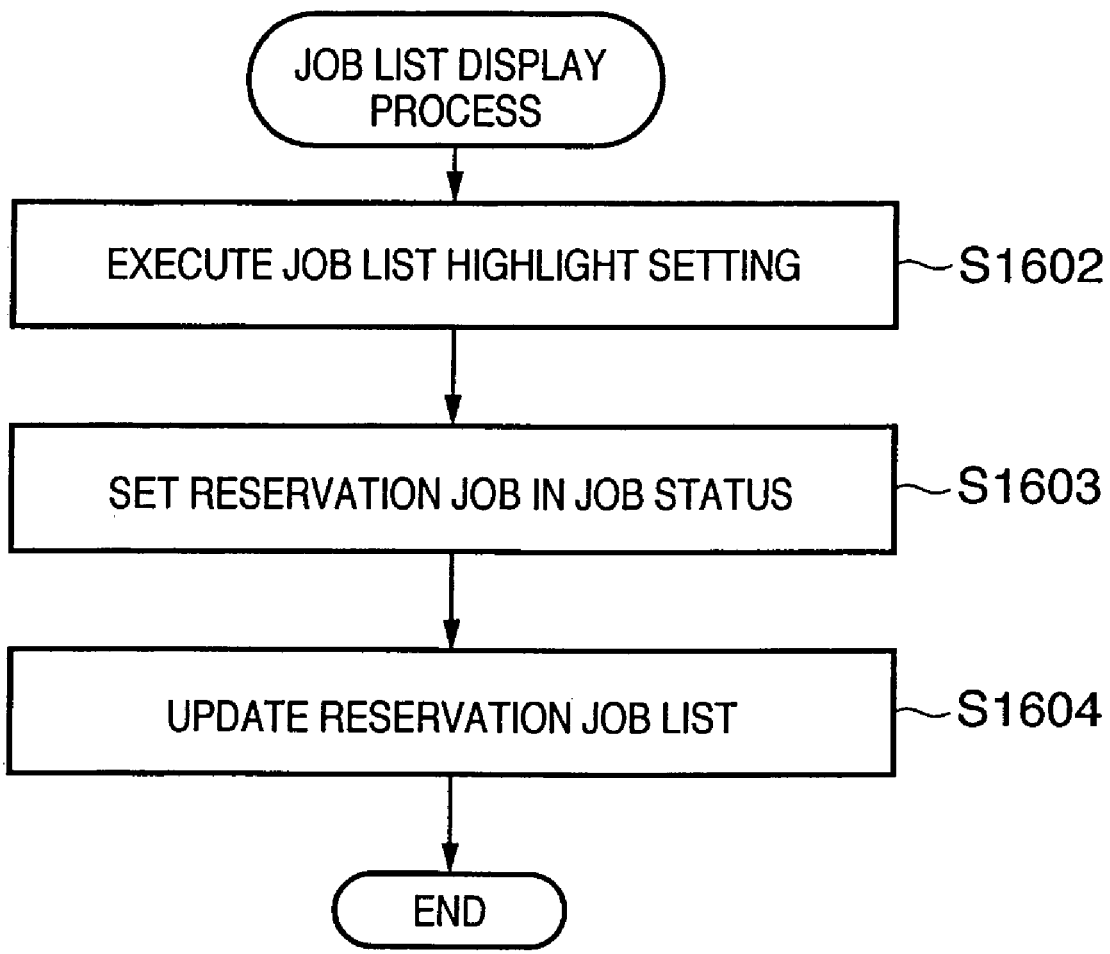
FIG. 17 is a flowchart showing details of a job list display process according to the embodiment of the present invention.

FIG. 17 is a flowchart showing details of the job list display process according to the embodiment of the present invention.

If image data of a job to be processed has not been received in step S1502 of FIG. 16, the MFP control unit 106 executes the job list display process. When the job to be processed is a reservation job, the MFP control unit 106 executes highlight setting of the job (step S1602).

Note that highlighting means that a reservation job among jobs in the job list 902 of FIG. 11A is discriminated from the remaining jobs. Hence, the display form is not limited to highlighting as far as a reservation job can be discriminated from the remaining jobs. For example, another display form such as blinking display or color display can also be employed.

Then, the reservation job is set in the job status of the job. In response to this, "reservation job" is displayed at the item "status" of the job list 902 in the job status window 900 of FIG. 11A. Further, the job is added to the reservation job list in the document management unit 111 to update the reservation job list.

In the embodiment, when image data of a job to be processed has not been received, the job is saved as a reservation job in the document management unit 111. However, the present invention is not limited to this. For example, when the "save selected job" button 903 is operated while an arbitrary job is selected in the job list 902 in the job status window 900 of FIG. 11A, the selected job may be saved as a reservation job in the document management unit 111.

Details of the reservation job save & restore process in step S1507 will be explained with reference to FIG. 18.

Figure 18:
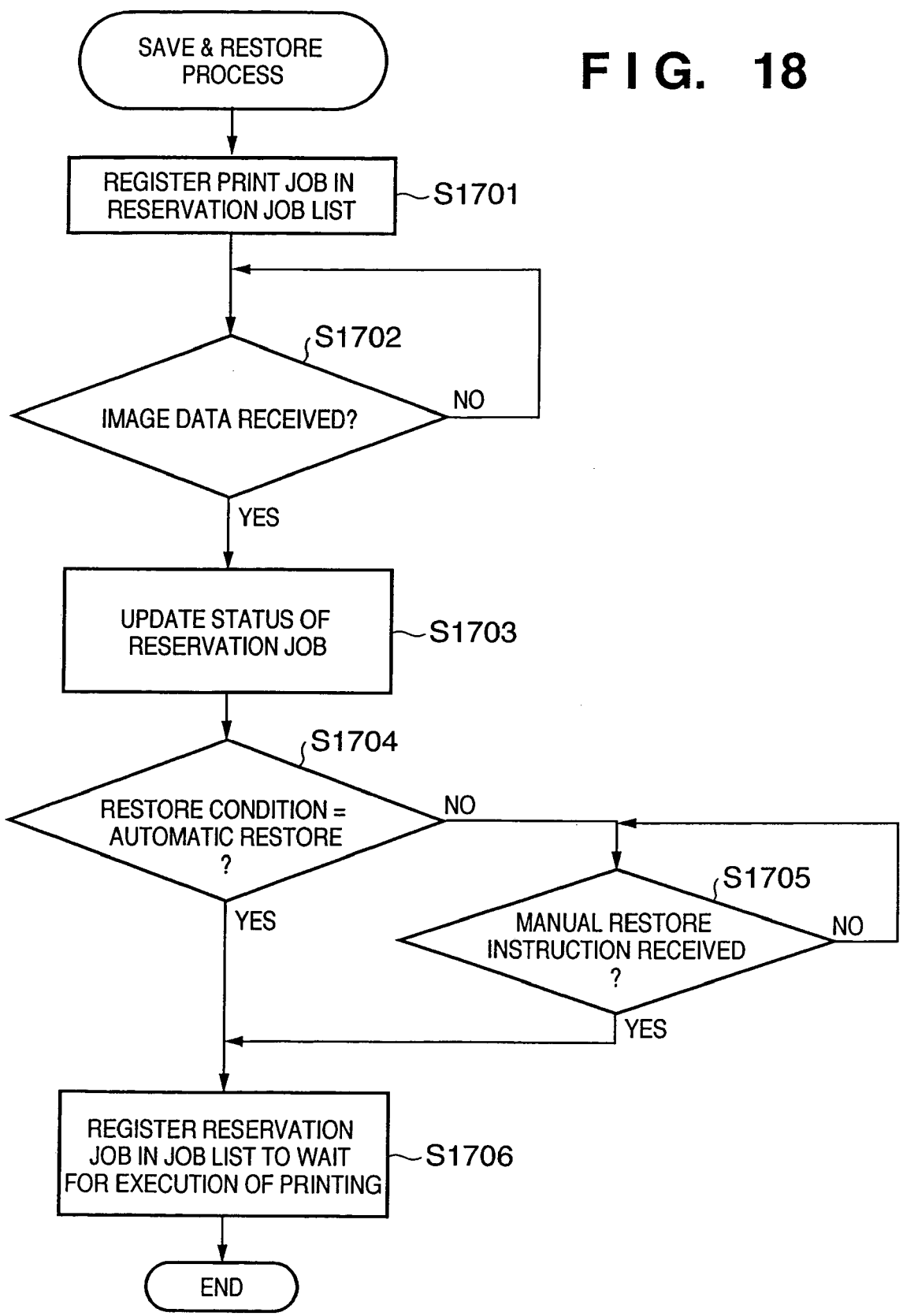
FIG. 18 is a flowchart showing details of a save & restore process according to the embodiment of the present invention.

FIG. 18 is a flowchart showing details of the reservation job save & restore process according to the embodiment of the present invention.

Operating the "save selected job" button 903 in step S1501 of FIG. 16 causes the MFP control unit 106 to temporarily save a designated print job in the document management unit 111. At the same time, the MFP control unit 106 registers the print job as a reservation job in the reservation job list (step S1701).

For each of reservation jobs in the reservation job list, the MFP control unit 106 sequentially determines whether corresponding image data has been received (step S1702). If no corresponding image data has been received (NO in step S1702), the MFP control unit 106 waits until it receives the image data. If the corresponding image data has been received (YES in step S1702), the MFP control unit 106 updates the status of the reservation job (step S1703). This update is reflected in the restore status in the reservation job status window 1400.

If a restorable reservation job exists, the MFP control unit 106 determines whether the restore condition setting of the reservation job is automatic restore (step S1704). If the restore condition setting is automatic restore (YES in step S1704), the MFP control unit 106 registers the reservation job in the job list to wait for execution of printing (step S1706), and ends the restore process.

If the restore condition setting is not automatic restore (NO in step S1704), i.e., is manual restore, the MFP control unit 106 waits until a restore instruction is manually issued (step S1705). The restore instruction is issued when the "restore job" button 1403 in the reservation job status window 1400 is pressed.

If no restore instruction is issued (NO in step S1705), the MFP control unit 106 waits until the restore instruction is issued. If the restore instruction is issued (YES in step S1705), the MFP control unit 106 registers the reservation job in the job list to wait for execution of printing (step S1706), and ends the restore process.

As described above, according to the embodiment, when an arbitrary job is transferred to the printing apparatus, it is confirmed whether all resources necessary to print the job are prepared in the printing apparatus. If not all resources are prepared, the job is temporarily saved. Thus, a subsequent printable job can be transferred, and the printing apparatus can efficiently print a printable job.

When a job is temporarily saved, the job is reserved by transferring only job setting information to the printing apparatus. When all resources necessary to print the job are prepared in the printing apparatus, corresponding image data is transferred. By this process, a printing process becomes efficient, and the printing order can be maintained.

When the printing apparatus receives image data of a reservation job, it prints the reservation job on the basis of restore condition setting. As the restore condition setting, the operator can arbitrarily select whether to print a job in a reserved order, list the job at the end of the current job list, or print the job next to a job during printing. A printing process optimal for the operator can be done.

Figure 19:
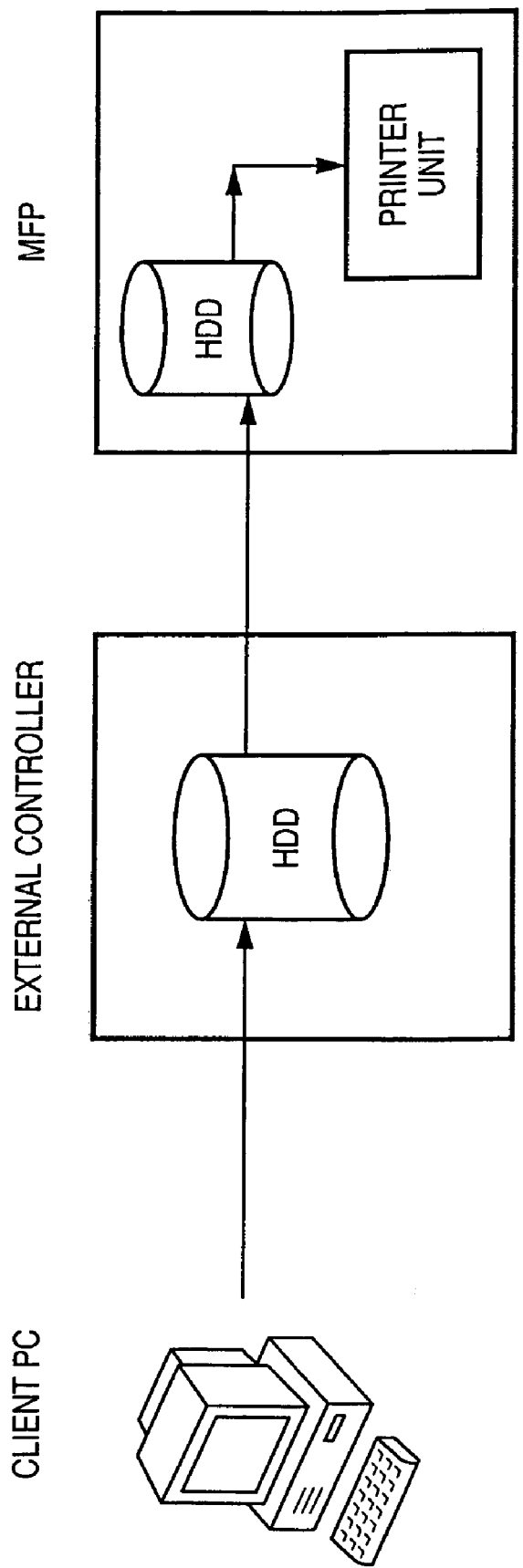
FIG. 19 is a view for explaining a problem in the prior art.

As described above, the configuration of the embodiment can efficiently continue a printing process even when an error occurs in a printing apparatus in an image forming system in which image data to be printed is generated by an image processing apparatus and supplied to the printing apparatus. Moreover, a convenient system can be constructed which can efficiently process a job even if an error occurs, and also copes with matters of concern assumable in a system configuration in FIG. 19 in which a printing apparatus and image processing apparatus are independent of each other.

In the embodiment, a condition to save and restore a job can be executed in response to generation of a printing interruption factor. As the printing interruption factor, there are various factors. For example, consumables such as printing toner and staples necessary for a print job by the printing apparatus run out. Other printing interruption factors are failures, troubles, and the like in the apparatus, such as a finishing error by the finisher, a sheet jam in the printer unit, and a document jam in the ADF. The control unit supports even these printing interruption factors, and applies various control operations in the embodiment.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the Present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like-mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-249948, filed Aug. 30, 2005, which is hereby incorporated by reference herein in its entirety.

What is claimed is:

1. A printing system which has an image processing apparatus and a printing apparatus, the image processing apparatus comprising:
an input unit constructed to input a print job;
a selecting unit constructed to select a condition from a plurality of conditions, for representing whether resources necessary to execute the print job input by the input unit are prepared in the printing apparatus; and
a transmission unit constructed to determine whether resources necessary to execute the print job input by the input step are prepared in the printing apparatus according to the condition selected by the selecting unit, and
when resources necessary to execute the print job input by the input unit are prepared in the printing apparatus, transmit image data of the print job and setting information of the print job to the printing apparatus, and
when resources necessary to execute the print job input by the input unit are not prepared in the printing apparatus, transmit setting information of the print job without transmitting image data of the print job,
wherein the transmission unit, when resources necessary to execute the print job are set in the printing apparatus, transmits image data of the print job to the printing apparatus, and
the printing apparatus comprising:
a reception unit constructed to receive image data of the print job and setting information of the print job from the image processing apparatus; a registration unit constructed to,
when the reception unit receives setting information of the print job and image data of the print job, register the print job as a job to wait for executing of printing, and
when the reception unit receives setting information of the print job and does not receive image data of the print job, register the print job as a reservation job; and
a printing unit constructed to execute a printing process on the basis of the print job registered as the job to wait for executing of printing,
wherein the registration unit, when the reception unit receives image data of the print job registered as the reservation job, registers the print job registered as the reservation job as a job to wait for executing of printing so that the print job registered as the reservation job is executed in order where the reception unit received setting information of the print job registered as the reservation job.

2. The system according to claim 1, wherein the printing apparatus further comprises a setting unit constructed to set an order where the print job registered as the reservation job should be executed, and
wherein the registration unit, when the reception unit receives image data of the print job registered as the reservation job, registers the print job registered as the reservation job as a job to wait for executing of printing so that the print job registered as the reservation job is executed in order set by setting unit.

3. The system according to claim 2, wherein the setting unit sets an order where the print job registered as the reservation job, from a plurality of orders including a first order after an order where a job of print jobs registered as job to wait for executing of printing is executed at the last, and a second order before an order where a job of print jobs registered as job to wait for executing of printing is executed at the last.

4. The system according to claim 3, wherein the second order is an order where the reception unit received setting information of the print job registered as the reservation job.

5. The system according to claim 3, wherein the second order is an order next to an order in executing print job when the reception unit receives image data of the print job registered as the reservation job.

6. The system according to claim 1, wherein the printing apparatus further comprises a reservation condition setting unit constructed to set a reservation condition for registering the print job as the reservation job, and
wherein the registration unit registers the print job as the reservation job according to the reservation condition.

7. The system according to claim 1, wherein the printing apparatus further comprises a restore condition setting unit constructed to set a restore condition for registering the print job registered as the reservation job as a job to wait for executing of printing, and
wherein the registration unit registers the print job registered as the reservation job as a job to wait for executing of printing according to the restore condition.

8. The system according to claim 1, wherein the registration unit, when the reception unit receives image data of the print job registered as the reservation job, registers the print job registered as the reservation job as a job to wait for executing of printing so that the print job registered as the reservation job is automatically executed in order where the reception unit received setting information of the print job registered as the reservation job.

9. The system according to claim 1, wherein the registration unit, when the reception unit receives image data of the print job registered as the reservation job, registers the print job registered as the reservation job as a job to wait for executing of printing so that the print job registered as the reservation job is executed according to user instruction in order where the reception unit received setting information of the print job registered as the reservation job.

10. A printing method of a printing system which has an image processing apparatus and a printing apparatus, the method comprising:
performing the following steps by the image processing apparatus:
an input step of inputting a print job;
a selecting step of selecting a condition from a plurality of conditions, for representing whether resources necessary to execute the print job input by the input step are prepared in the printing apparatus; and
a transmission step of determining whether resources necessary to execute the print job input by the input step are prepared in the printing apparatus according to the condition selected by the selecting step, and
when resources necessary to execute the print job input by the input step are prepared in the printing apparatus, transmitting image data of the print job and setting information of the print job to the printing apparatus, and
when resources necessary to execute the print job input by the input step are not prepared in the printing apparatus, transmitting setting information of the print job without transmitting image data of the print job,
wherein the transmission step, when resources necessary to execute the print job are set in the printing apparatus, transmits image data of the print job to the printing apparatus; and
performing the following steps by the printing apparatus:
a reception step of receiving image data of the print job and setting information of the print job from the image processing apparatus;
a registration step of,
when the reception step receives setting information of the print job and image data of the print job, registering the print job as a job to wait for executing of printing, and
when the reception step receives setting information of the print job and does not receive image data of the print job, registering the print job as a reservation job,
wherein the registration step, when the reception step receives image data of the print job registered as the reservation job, registers the print job registered as the reservation job as a job to wait for executing of printing so that the print job registered as the reservation job is executed in order where the reception step received setting information of the print job registered as the reservation job; and
a printing step of executing a printing process on the basis of the print job registered as the job to wait for executing of printing.

11. A non-transitory computer-readable storage medium storing a computer-executable program for a printing system which has an image processing apparatus and a printing apparatus, the computer-executable program comprising:
performing the following steps by the image processing apparatus:
an input step of inputting a print job;
a selecting step of selecting a condition from a plurality of conditions, for representing whether resources necessary to execute the print job input by the input step are prepared in the printing apparatus; and
a transmission step of determining whether resources necessary to execute the print job input by the input step are prepared in the printing apparatus according to the condition selected by the selecting step, and
when resources necessary to execute the print job input by the input step are prepared in the printing apparatus, transmitting image data of the print job and setting information of the print job to the printing apparatus, and
when resources necessary to execute the print job input by the input step are not prepared in the printing apparatus, transmitting setting information of the print job without transmitting image data of the print job,
wherein the transmission step, when resources necessary to execute the print job are set in the printing apparatus, transmits image data of the print job to the printing apparatus; and
performing the following steps by the printing apparatus:
a reception step of receiving image data of the print job and setting information of the print job from the image processing apparatus;
a registration step of,
when the reception step receives setting information of the print job and image data of the print job, registering the print job as a job to wait for executing of printing, and
when the reception step receives setting information of the print job and does not receive image data of the print job, registering the print job as a reservation job,
wherein the registration step, when the reception step receives image data of the print job registered as the reservation job, registers the print job registered as the reservation job as a job to wait for executing of printing so that the print job registered as the reservation job is executed in order where the reception step received setting information of the print job registered as the reservation job; and a printing step of executing a printing process on the basis of the print job registered as the job to wait for executing of printing.

12. A printing system having an image processing apparatus and a printing apparatus, the image processing apparatus comprising:
an input unit constructed to input a print job; and
a transmission unit constructed to determine whether resources necessary to execute the print job input by the input unit are prepared in the printing apparatus according to a condition selected by a selecting unit of the printing apparatus, and
when resources necessary to execute the print job input by the input unit are prepared in the printing apparatus, transmit image data of the print job and setting information of the print job to the printing apparatus, and
when resources necessary to execute the print job input by the input unit are not prepared in the printing apparatus, transmit setting information of the print job without transmitting image data of the print job,
wherein the transmission unit, when resources necessary to execute the print job are set in the printing apparatus, transmits image data of the print job to the printing apparatus, and the printing apparatus comprising:
a selecting unit constructed to select the condition from a plurality of conditions, for representing whether resources necessary to execute the print job received by the input unit of the image processing apparatus are prepared in the printing apparatus;
a reception unit constructed to receive image data of the print job and setting information of the print job from the image processing apparatus;
a registration unit constructed to,
when the reception unit receives setting information of the print job and image data of the print job, register the print job as a job to wait for executing of printing, and
when the reception unit receives setting information of the print job and does not receive image data of the print job, register the print job as a reservation job,
wherein the registration unit, when the reception unit receives image data of the print job registered as the reservation job, registers the print job registered as the reservation job as a job to wait for executing of printing so that the print job registered as the reservation job is executed in order where the reception unit received setting information of the print job registered as the reservation job; and
a printing unit constructed to execute a printing process on the basis of the print job registered as the job to wait for executing of printing.

13. A method of a printing system having an image processing apparatus and a printing apparatus, the method comprising:
performing the following steps by the image processing apparatus:
an input step of inputting a print job;
a transmission step of determining whether resources necessary to execute the print job input by the input step are prepared in the printing apparatus according to a condition selected by a selecting step of the printing apparatus, and
when resources necessary to execute the print job input by the input step are prepared in the printing apparatus, transmitting image data of the print job and setting information of the print job to the printing apparatus; and
when resources necessary to execute the print job input by the input step are not prepared in the printing apparatus, transmitting setting information of the print job without transmitting image data of the print job,
wherein the transmission step, when resources necessary to execute the print job are set in the printing apparatus, transmits image data of the print job to the printing apparatus; and performing the following steps by the printing apparatus:
the selecting step of selecting the condition from a plurality of conditions, for representing whether resources necessary to execute the print job input by the input step of the image processing apparatus are prepared in the printing apparatus;
a reception step of receiving image data of the print job and setting information of the print job from the image processing apparatus;
a registration step of,
when the reception step receives setting information of the print job and image data of the print job, registering the print job as a job to wait for executing of printing, and
when the reception step receives setting information of the print job and does not receive image data of the print job, registering the print job as a reservation job,
wherein the registration step, when the reception step receives image data of the print job registered as the reservation job, registers the print job registered as the reservation job as a job to wait for executing of printing so that the print job registered as the reservation job is executed in order where the reception unit received setting information of the print job registered as the reservation job; and
a printing step of executing a printing process on the basis of the print job registered as the job to wait for executing of printing.

14. A non-transitory computer-readable storage medium storing a computer-executable program for a printing system which has an image processing apparatus and a printing apparatus, the computer-executable program comprising:
performing the following steps by the image processing apparatus:
an input step of inputting a print job;
a transmission step of determining whether resources necessary to execute the print job input by the input step are prepared in the printing apparatus according to a condition selected by a selecting step of the printing apparatus, and
when resources necessary to execute the print job input by the input step are prepared in the printing apparatus, transmitting image data of the print job and setting information of the print job to the printing apparatus, and
when resources necessary to execute the print job input by the input step are not prepared in the printing apparatus, transmitting setting information of the print job without transmitting image data of the print job,
wherein the transmission step, when resources necessary to execute the print job are set in the printing apparatus, transmits image data of the print job to the printing apparatus; and performing the following steps by the printing apparatus:

the selecting step of selecting the condition from a plurality of conditions, for representing whether resources necessary to execute the print job input by the input step of the image processing apparatus are prepared in the printing apparatus;

a reception step of receiving image data of the print job and setting information of the print job from the image processing apparatus;

a registration step of, when the reception step receives setting information of the print job and image data of the print job, registering the print job as a job to wait for executing of printing, and when the reception step receives setting information of the print job and does not receive image data of the print job, registering the print job as a reservation job, wherein the registration step, when the reception step receives image data of the print job registered as the reservation job, registers the print job registered as the reservation job as a job to wait for executing of printing so that the print job registered as the reservation job is executed in order where the reception unit received setting information of the print job registered as the reservation job; and a printing step of executing a printing process on the basis of the print job registered as the job to wait for executing of printing.

15. An image processing apparatus, comprising an input unit constructed to input a print job;

a selecting unit constructed to select a condition from a plurality of conditions, for representing whether resources necessary to execute the print job input by the input unit are prepared in a printing apparatus; and a transmission unit constructed to determine whether resources necessary to execute the print job input by the input unit are prepared in the printing apparatus according to the condition selected by the selecting unit, and when resources necessary to execute the print job input by the input unit are prepared in a printing apparatus, transmit image data of the print job and setting information of the print job to the printing apparatus, and when resources necessary to execute the print job input by the input unit are not prepared in the printing apparatus, transmit setting information of the print job without transmitting image data of the print job, wherein the transmission unit, when resources necessary to execute the print job are set in the printing apparatus, transmits image data of the print job to the printing apparatus.

16. A printing apparatus, comprising:

a reception unit constructed to receive image data of a print job and setting information of the print job from an image processing apparatus;

a selecting unit constructed to select a condition from a plurality of conditions, for representing whether resources necessary to execute the print job as input by an input unit of the image processing apparatus are prepared in the printing apparatus;

a registration unit constructed to, when the reception unit receives setting information of the print job and image data of the print job, registers the print job as a job to wait for executing of printing, and when the reception unit receives setting information of the print job and does not receive image data of the print job, registers the print job as a reservation job, wherein the registration unit, when the reception unit receives image data of the print job registered as the reservation job, registers the print job registered as the reservation job as a job to wait for executing of printing so that the print job registered as the reservation job is executed in order where the reception unit received setting information of the print job registered as the reservation job; and a printing unit constructed to execute a printing process on the basis of the print job registered as the job to wait for executing of printing.

* * * * *